US008633461B2

(12) United States Patent
Fago et al.

(10) Patent No.: US 8,633,461 B2
(45) Date of Patent: Jan. 21, 2014

(54) RADIATION-SHIELDING ASSEMBLIES AND METHODS OF USING THE SAME

(75) Inventors: Frank M. Fago, Mason, OH (US); David W. Wilson, Loveland, OH (US); Gary S. Wagner, Independence, KY (US); Ralph E. Pollard, Jr., Fairfield, MO (US)

(73) Assignee: Mallinckrodt LLC, Hazelwood, MO (US)

( * ) Notice: Subject to any disclaimer, the term of this patent is extended or adjusted under 35 U.S.C. 154(b) by 0 days.

(21) Appl. No.: 13/107,365

(22) Filed: May 13, 2011

(65) Prior Publication Data

US 2011/0215264 A1 Sep. 8, 2011

Related U.S. Application Data

(62) Division of application No. 11/995,744, filed as application No. PCT/US2006/029056 on Jul. 26, 2006, now Pat. No. 8,003,967.

(60) Provisional application No. 60/702,942, filed on Jul. 27, 2005.

(51) Int. Cl.
*B23P 11/00* (2006.01)

(52) U.S. Cl.
USPC .................... 250/506.1; 250/423 R; 250/433; 250/505.1; 250/507.1; 250/515.1

(58) Field of Classification Search
USPC ............. 250/428, 423 R, 433, 434, 435, 436, 250/432 PD, 505.1, 506.1, 507.1, 515.1
See application file for complete search history.

(56) References Cited

U.S. PATENT DOCUMENTS

| | | | |
|---|---|---|---|
| 804,610 | A | 11/1905 | Lieber |
| 2,915,640 | A | 12/1959 | Grubel et al. |
| 3,256,441 | A | 6/1966 | Grasty |
| 3,369,121 | A | 2/1968 | Bruno et al. |
| 2,937,745 | A | 5/1970 | Wilson |

(Continued)

FOREIGN PATENT DOCUMENTS

| | | | |
|---|---|---|---|
| CN | 1630914 | A | 6/2005 |
| JP | 07149361 | A | 6/1995 |

(Continued)

OTHER PUBLICATIONS

International Search Report and Written Opinion of the International Search Authority mailed on Feb. 23, 2007 regarding PCT/US2006/029056 filed on Jul. 26, 2006, 6 pgs.

*Primary Examiner* — Michael Logie
(74) *Attorney, Agent, or Firm* — Armstrong Teasdale LLP

(57) ABSTRACT

In one characterization, the present invention relates to a radiation-shielding assembly for holding a container having a radioactive material disposed therein. The assembly may, at least in one regard, be referred to as an elution shield and/or a dispensing shield. The assembly includes a body at least partially defining a cavity. There is at least one opening through the body into the cavity. The assembly may include a cap that at least generally hinders escape of radiation from the assembly through the opening. The cap may be releasably attached to the body in one orientation and may establish non-attached engagement with the body in another orientation. The assembly may include an adjustable spacer system for adapting the assembly for use with containers having different heights.

16 Claims, 36 Drawing Sheets

(56) References Cited

U.S. PATENT DOCUMENTS

| | | | | | |
|---|---|---|---|---|---|
| 3,531,644 | A | | 9/1970 | Koster | |
| 3,655,985 | A | * | 4/1972 | Brown et al. | 250/506.1 |
| 3,709,365 | A | | 1/1973 | Czaplinski et al. | |
| 3,710,121 | A | | 1/1973 | Bedrosian | |
| 3,882,315 | A | | 5/1975 | Soldan | |
| 3,971,955 | A | | 7/1976 | Heyer et al. | |
| 4,074,824 | A | | 2/1978 | Kontes | |
| 4,084,097 | A | * | 4/1978 | Czaplinski et al. | 250/506.1 |
| 4,333,010 | A | | 6/1982 | Miller | |
| 4,382,512 | A | | 5/1983 | Furminger | |
| 4,418,826 | A | | 12/1983 | Mancini et al. | |
| 4,447,729 | A | | 5/1984 | Doroszlai et al. | |
| 4,506,155 | A | * | 3/1985 | Suzuki et al. | 250/252.1 |
| 4,517,851 | A | | 5/1985 | Tice | |
| 4,673,813 | A | | 6/1987 | Sanchez | |
| 4,688,703 | A | | 8/1987 | Bayer | |
| 4,723,687 | A | | 2/1988 | Kutterer | |
| 4,788,438 | A | | 11/1988 | Evers | |
| 4,805,789 | A | | 2/1989 | Lancesseur et al. | |
| 4,833,329 | A | * | 5/1989 | Quint et al. | 250/432 PD |
| 4,846,235 | A | * | 7/1989 | Handke | 141/311 R |
| 4,869,299 | A | | 9/1989 | Handke | |
| 4,880,119 | A | | 11/1989 | Simon | |
| 4,923,088 | A | * | 5/1990 | Tanaka et al. | 220/23.87 |
| 5,274,239 | A | | 12/1993 | Lane et al. | |
| 5,316,146 | A | | 5/1994 | Graff | |
| 5,397,902 | A | * | 3/1995 | Castner et al. | 250/432 PD |
| 5,552,612 | A | | 9/1996 | Katayama et al. | |
| 5,590,782 | A | | 1/1997 | Haber et al. | |
| 5,834,788 | A | | 11/1998 | Fu et al. | |
| 5,927,351 | A | | 7/1999 | Zhu et al. | |
| 5,944,190 | A | | 8/1999 | Edelen | |
| 6,576,918 | B1 | | 6/2003 | Fu et al. | |
| 6,614,040 | B1 | | 9/2003 | Zens | |
| 6,619,494 | B1 | | 9/2003 | Brozell et al. | |
| 6,781,142 | B2 | | 8/2004 | Hutcheson | |
| 6,802,427 | B2 | | 10/2004 | Miceli et al. | |
| 6,812,475 | B1 | | 11/2004 | Huang | |
| 6,983,843 | B2 | | 1/2006 | Van Geert et al. | |
| 7,019,317 | B1 | | 3/2006 | Martin et al. | |
| 7,170,072 | B2 | * | 1/2007 | Schwarz et al. | 250/507.1 |
| 7,473,918 | B2 | | 1/2009 | Yanke et al. | |
| 2003/0141210 | A1 | * | 7/2003 | Yanke et al. | 206/364 |
| 2005/0107698 | A1 | | 5/2005 | Powers et al. | |
| 2005/0121015 | A1 | | 6/2005 | Postorivo, Jr. | |
| 2005/0171484 | A1 | * | 8/2005 | Jangula | 604/198 |
| 2006/0023842 | A1 | * | 2/2006 | Sohal et al. | 378/147 |
| 2006/0030832 | A1 | | 2/2006 | Niedospial, Jr. et al. | |
| 2006/0086909 | A1 | | 4/2006 | Schaber | |
| 2007/0129591 | A1 | | 6/2007 | Yanke et al. | |

FOREIGN PATENT DOCUMENTS

| | | | | |
|---|---|---|---|---|
| JP | 10177098 | A | | 6/1998 |
| JP | 2004129712 | A1 | | 4/2004 |
| WO | 0062305 | A1 | | 10/2000 |
| WO | 03045546 | A1 | | 6/2003 |
| WO | WO 2004036597 | A1 | * | 4/2004 |

* cited by examiner

RADIATION-SHIELDING ASSEMBLIES AND METHODS OF USING THE SAME

CROSS-REFERENCE TO RELATED APPLICATIONS

This application is a divisional of U.S. patent application Ser. No. 11/995,744 filed on Jan. 1, 2008, which is a National Stage Application of PCT/US2006/29056 filed on Jul. 26, 2006, which claims priority to U.S. Provisional Patent Application No. 60/702,942 filed on Jul. 27, 2005, the entire disclosures of all these applications being incorporated herein by reference.

FIELD OF THE INVENTION

The present invention relates generally to radiation-shielding devices for radioactive materials and, more particularly, to radiation-shielding assemblies used to enclose radioactive materials used in the preparation and/or dispensing of radiopharmaceuticals.

BACKGROUND

Nuclear medicine is a branch of medicine that uses radioactive materials (e.g., radioisotopes) for various research, diagnostic and therapeutic applications. Radiopharmacies produce various radiopharmaceuticals (i.e., radioactive pharmaceuticals) by combining one or more radioactive materials with other materials to adapt the radioactive materials for use in a particular medical procedure.

For example, radioisotope generators may be used to obtain a solution comprising a daughter radioisotope (e.g., Technetium-99m) from a parent radioisotope (e.g., Molybdenum-99) which produces the daughter radioisotope by radioactive decay. A radioisotope generator may include a column containing the parent radioisotope adsorbed on a carrier medium. The carrier medium (e.g., alumina) has a relatively higher affinity for the parent radioisotope than the daughter radioisotope. As the parent radioisotope decays, a quantity of the desired daughter radioisotope is produced. To obtain the desired daughter radioisotope, a suitable eluant (e.g., a sterile saline solution) can be passed through the column to elute the daughter radioisotope from the carrier. The resulting eluate contains the daughter radioisotope (e.g., in the form of a dissolved salt), which makes the eluate a useful material for preparation of radiopharmaceuticals. For example, the eluate may be used as the source of a radioisotope in a solution adapted for intravenous administration to a patient for any of a variety of diagnostic and/or therapeutic procedures.

In one method of obtaining a quantity of the eluate from the generator, an evacuated container (e.g., an elution vial) may be connected to the generator at a tapping point. For example, a hollow needle on the generator can be used to pierce a septum of an evacuated container to establish fluid communication between the elution vial and the generator column. The partial vacuum of the container can draw eluant from an eluant reservoir through the column and into the vial, thereby eluting the daughter radioisotope from the column. The container may be contained in an elution shield, which is a radiation-shielding device used to shield workers from radiation emitted by the eluate after it is received in the container from the generator.

After the elution is complete, the activity of the eluate may be calibrated by transferring the container to a calibration system. Calibration may involve removing the container from the shielding assembly and placing it in the calibration system to measure the amount of radioactivity emitted by the eluate. A breakthrough test may be performed to confirm that the amount of the parent radioisotope in the eluate does not exceed acceptable tolerance levels. The breakthrough test may involve transfer of the container to a thin shielding cup (e.g., a cup that effectively shields radiation emitted by the daughter isotope but not higher-energy radiation emitted by the parent isotope) and measurement of the amount of radiation that penetrates the shielding of the cup.

After the calibration and breakthrough tests, the container may be transferred to a dispensing shield. The dispensing shield shields workers from radiation emitted by the eluate in the container as the eluate is transferred from the container into one or more other containers (e.g., syringes) for use later in the radiopharmaceutical preparation process. Dispensing shields are generally lighter weight and easier to handle than elution shields for the dispensing process because each of the containers may be used to fill multiple containers (e.g., off and on over the course of a day) and it is generally desirable to place the shielded container upside down on a work surface (e.g., tabletop surface) during the idle periods between transfer of the eluate into one container and the next. Prior art elution shields are generally not conducive for use as dispensing shields because, among other reasons, they may be unstable when inverted. For example, some elution shields have a heavy base that results in a relatively high center of gravity when the elution shield is upside down. Further, some elution shields have upper surfaces that are not adapted for resting on a flat work surface (e.g., upper surfaces with bumps that would make the elution shield unstable if it were placed on a flat surface upside down). Radiopharmacies have addressed this problem by maintaining a supply of elution shields and another supply of dispensing shields. This solution necessitates a transfer of the container from an elution shield to a dispensing shield, which can undesirably expose a worker to radiation.

The same generator may be used to fill a number of containers before the radioisotopes in the column are spent. The volume of eluate needed at any time may vary depending on the number of prescriptions that need to be filled by the radiopharmacy and/or the remaining concentration of radioisotopes in the generator column. One way to vary the amount of eluate drawn from the column is to vary the volume of evacuated containers used to receive the eluate. For example, container volumes ranging from about 5 mL to about 30 mL are common and standard containers having volumes of 5 mL, 10 mL, or 20 mL are currently used in the industry. A container having a desired volume may be selected to facilitate dispensing of a corresponding amount of eluate from the generator column.

Unfortunately, the use of multiple different sizes of containers is associated with significant disadvantages. For example, a radiopharmacy must either keep a supply of labels, rubber stoppers, flanged metal caps, spacers and/or lead shields in stock for each type of container it uses, or use shielding devices that can be adapted for use with containers of various sizes. One solution that has been practiced is to keep a variety of different spacers on hand to occupy extra space in the radiation shielding devices when smaller containers are being used. Unfortunately, this adds to the complexity and increases the risk of confusion because the spacers can get mixed up, lost, broken, or used with the wrong container and are generally inconvenient to use. For instance, some conventional spacers surround the sides of the containers in the shielding-devices, which is where labels may be attached to the containers. Accordingly, the spacers may mar the labels and/or adhesives used to attach the labels to the container resultantly causing the spacers to stick to the sides of the container or otherwise gum up the radiation-shielding device.

Thus, there is a need for improved radiation-shielding assemblies and methods of handling containers containing one or more radioisotopes that facilitates safer, more convenient, and more reliable handling of radioactive materials produced for nuclear medicine.

SUMMARY

One aspect of the present invention is directed to a radiation-shielding assembly that may be used to shield a radioactive material in an elution process and/or in a dispensing process. The assembly includes a body having a cavity and an opening into the cavity defined therein. The assembly also includes a cap adapted for releasable attachment (e.g., via magnetism) to the body when the cap is in a first orientation relative to the body and for non-attached engagement with the body when the cap is in a second orientation relative to the body. Incidentally, a "non-attached engagement" or the like means that first and second structures interface but are not attached. An example of a non-attached engagement would be the interface of a drinking cup disposed on a coaster.

Another aspect of the invention is directed to use of a radiation-shielding assembly. In this method, a cap of the radiation-shielding assembly is releasably attached to a body of the assembly to cover an opening into the body and to limit escape of radiation from inside the assembly. The cap is removed from the body and placed on an appropriate support surface (e.g., working surface). The body is inverted and placed on top of the cap so that the cap is in a different orientation relative to the body than it was when it was releasably attached to the body, thereby causing the cap and body to be in non-attached engagement. The body may be lifted from the cap to expose the opening.

Another aspect of the invention is directed to a radiation-shielding assembly that can be used to shield an eluate (e.g., solution that includes a radioisotope from a radioisotope generator). The assembly has a body at least partially defining a cavity for receiving the eluate. There is an opening through the body into the cavity at an end of the body. The body is designed/configured to limit escape of radiation emitted by the radioisotope from the elution shield through the body. The assembly also has a base that may be releasably secured to the body at a second end thereof. The base has a sidewall extension portion aligned with the circumferential sidewall when the base is secured to the body. The sidewall extension portion of the base has a relatively lighter-weight construction in comparison to the circumferential sidewall of the body. For instance, the sidewall extension portion of the base may be made of a material exhibiting a first weight density, and the circumferential sidewall of the body may be made of another material having a second weight density greater than the first weight density.

Another aspect of the invention is directed to a method of making an elution shield for a radioisotope received from a radioisotope generator. A body of the elution shield includes a radiation-shielding material and is formed to have a cavity for receiving the radioisotope therein. A base of the elution shield includes a material that would be substantially transparent to radiation emitted by the radioisotope. The material of the base is a relatively lighter-weight material than the radiation-shielding material of the body. The base is formed to connect to the body and extend the overall length of the elution shield to a length greater than the length of the body.

Still another aspect of the invention is directed to a radiation-shielding assembly for holding any one of a set of containers that have different heights and that may be used to contain a radioactive substance. The assembly has a body at least partially defining a cavity for receiving a container. The assembly is preferably constructed to limit the escape of radiation emitted in the cavity from the assembly. The cavity has first and second opposite ends. The assembly also has a spacer that can be at least partially disposed in the cavity (e.g. at or near the second end of the cavity). The spacer is selectively adjustable to change the amount of space between a support surface of the spacer and the first end of the cavity by translation of the support surface so the support surface positions the containers in substantially the same location relative to the first end of the cavity.

Yet another aspect of the invention is directed to a method of using a radiation-shielding assembly to handle containers that have different heights and which are used to hold a radioactive substance. A first container is placed in a cavity defined in the radiation-shielding assembly. A spacer is associated with the cavity and is utilized to position the first container at a predetermined location relative to an end of the cavity. The first container is subsequently removed from the cavity. The spacer is adjusted by moving the spacer along an axis of the cavity to change the amount of space between the spacer and the end of the cavity. A second container having a different height than the first container is placed in the cavity. The adjustment of the spacer results in the second container being positioned at substantially the same predetermined location as the first container was relative to the end of the cavity.

Still another aspect of the invention is direction to a radiation-shielding assembly for container holding a radioactive eluate. The assembly has a body at least partially defining a cavity for receiving the container. There is an opening through the body into the cavity. The opening is sized to permit the container to be placed into and removed from the cavity. The body of the assembly is constructed to limit escape of radiation from the radioactive material through the body. The assembly also includes a locator in the cavity opposite the opening for at least assisting in locating the container in a predetermined position in the cavity. The locator may be characterized as a guide that can interface with one end of the container and that is shaped so that, upon interfacing with the end of the container, the collar may be used to at least generally steer or direct the container to the predetermined position in the cavity. The locator may include and of a wide range of materials. For instance, in some embodiments, the locator may include or be made entirely from a material that is substantially transparent to radiation.

Another aspect of the invention is directed to a method of making a radiation shielding assembly for a container containing a radioactive eluate. A body of the assembly includes shielding material capable of substantially limiting passage of radiation through the material. The body is formed with a cavity for receiving the container of radioactive eluate. A locator is formed from a material that is substantially transparent to radiation so that the locator can be received in the cavity and engage the container when placed in the cavity to locate the container in (e.g., guide or steer the container toward) a predetermined position relative to the body in the cavity.

Still another aspect of the invention is directed to a radiation-shielding assembly for holding any one of a set of containers having different heights that are used for containing a radioactive substance. The assembly has a body at least partially defining a cavity for receiving a container. The assembly also has a spacer adapted to be at least partially received in the cavity. The spacer can selectively be placed in the cavity to occupy space in the cavity to adapt the assembly for use with at least one of the smaller containers or removed from the cavity to adapt the assembly for use with at least one of the larger containers. The assembly may also have a base adapted for releasable connection to the body. The base may have a stowage receptacle defined therein that can receive the spacer when the spacer is removed from the cavity.

Yet another aspect of the invention is a method of using a radiation-shielding assembly to hold containers having different heights that are used for containing a radioactive substance. A spacer is placed in a cavity of the assembly to adapt the assembly for use with a first container. The first container may be substantially enclosed in the cavity. The first container is subsequently removed from the cavity. The spacer may also be removed from the cavity to adapt the assembly for use with a second container that is taller than the first container. When not in use, the spacer may be stowed in a stowage receptacle formed in the assembly. The second container may be substantially enclosed in the cavity.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the aspects of the present invention alone or in any combination.

BRIEF DESCRIPTION OF THE FIGURES

Corresponding reference characters indicate corresponding parts throughout the figures.

DETAILED DESCRIPTION OF ILLUSTRATED EMBODIMENTS

Figure 1:
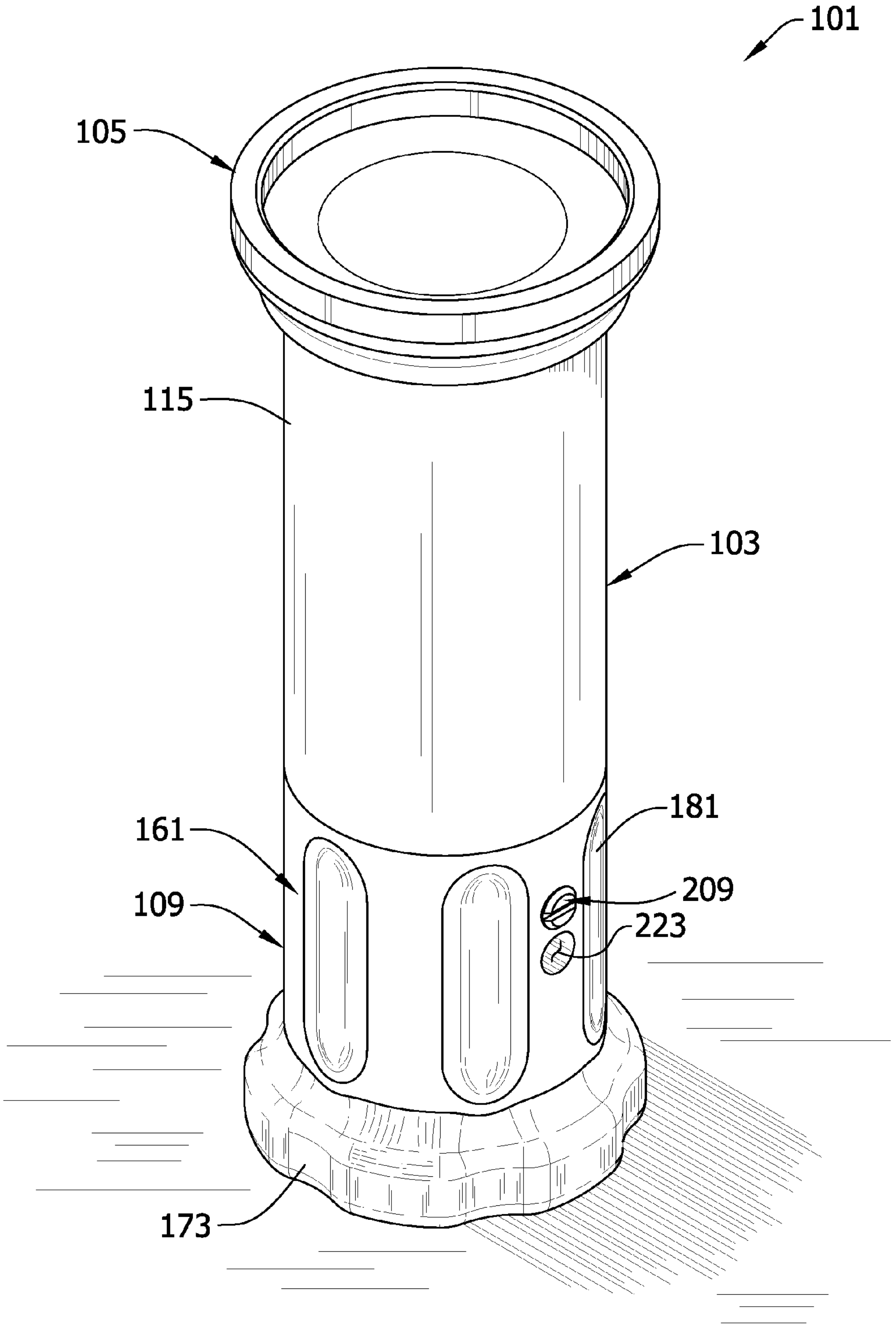
FIG. 1 is a perspective view of one embodiment of a radiation-shielding assembly.
Figure 2:
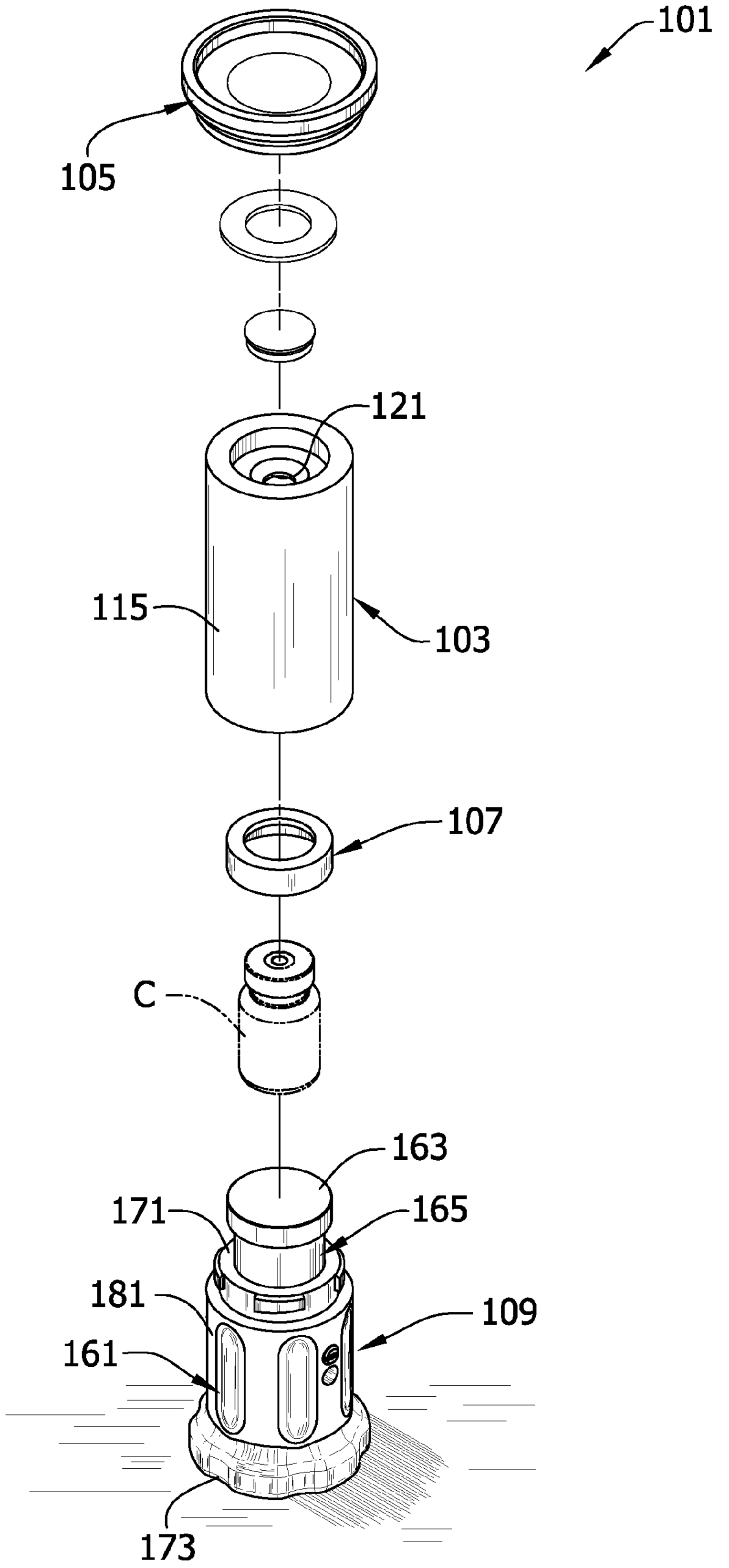
FIG. 2 is an exploded view of the assembly of FIG. 1.
Figure 3:
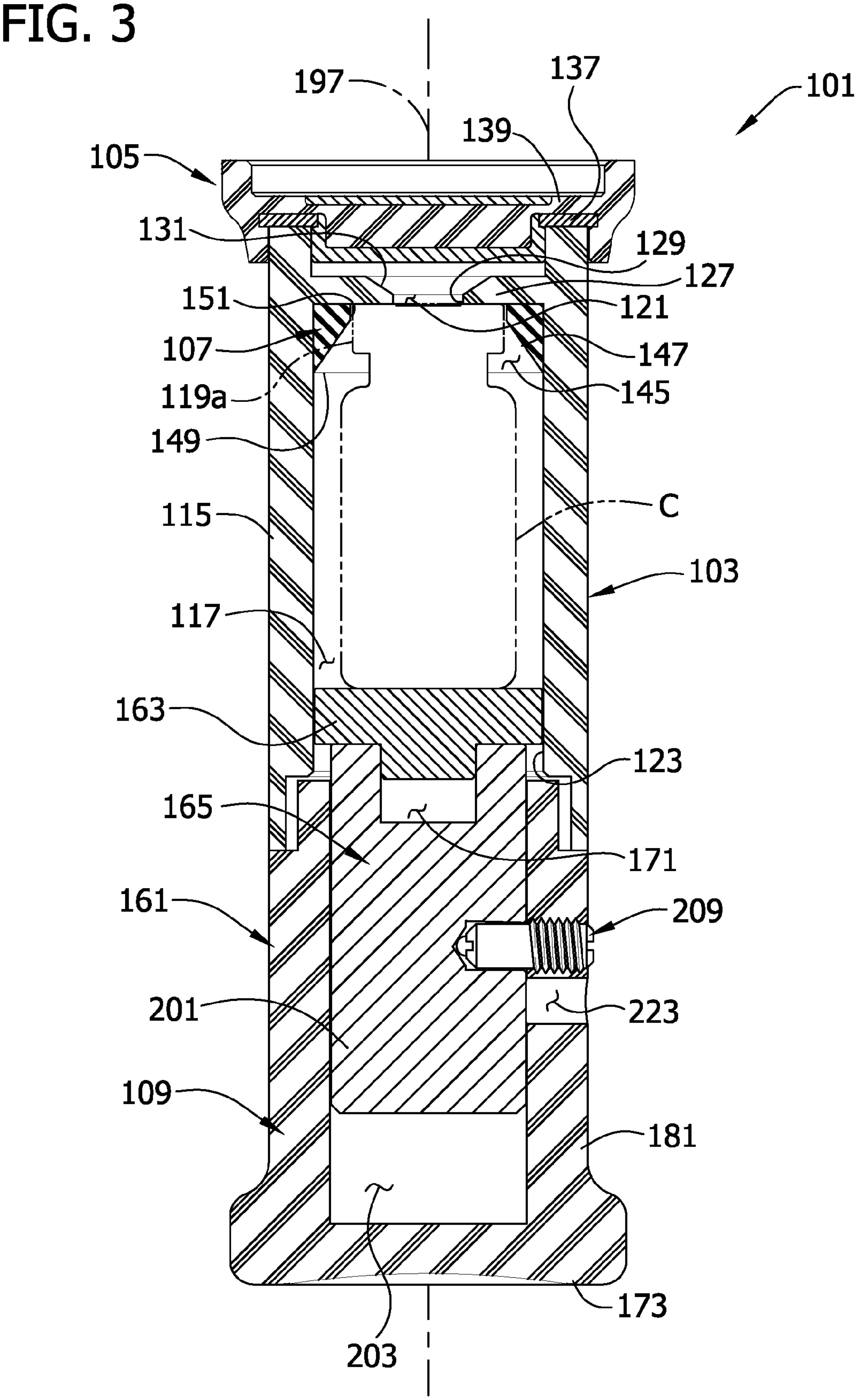
FIG. 3 is a vertical section thereof.

Referring now to the figures, first to FIGS. 1-3 in particular, one embodiment of a radiation-shielding assembly of the present invention is shown as a rear-loaded dual-purpose radioisotope elution and dispensing shield, generally designated 101. The assembly 101 may enclose a container (e.g., eluate vial) containing a radioisotope (e.g., Technetium-99m) that emits radiation in a radiation-shielded cavity in the assembly, thereby limiting escape of radiation emitted by the radioisotope from the assembly. Thus, the assembly may be used to limit the radiation exposure to workers handling of one or more radioisotopes or other radioactive material.

As shown in FIGS. 2 and 3, the illustrated assembly 101 generally has a body 103, a cap 105, a collar 107, and a base 109. The body 103 may include a circumferential sidewall 115 partially defining a cavity 117 adapted to receive a container C (shown in phantom). The cap 105 may be releasably attached to one end of the body 103 while the base 109 may be releasably attached to the other end of the body. The collar 107 may be received in the cavity 117, if desired, to help guide the container C into a desired position in the body 103 as it is loaded into the assembly 101. When assembled together, as shown in FIGS. 1 and 3, the body 103, cap 105, and base 109 may be used to enclose the container C in the cavity 117 of the assembly 101 and form a shielding unit that limits escape of radiation in the cavity 117 from the assembly 101.

The sidewall 115 of the body 103 shown in the figures is substantially tubular, but the sidewall can have other shapes (e.g., polygonal) without departing from the scope of the invention. The sidewall 115 may be adapted to limit escape of radiation emitted in the cavity 117 from the assembly 101 through the sidewall. For example, in one embodiment the sidewall 115 includes a radiation-shielding material (e.g., lead, tungsten, depleted uranium or another dense material). The radiation-shielding material can be in the form of one or more layers (not shown). Some or all of the radiation-shielding material can be in the form of substrate impregnated with one or more radiation-shielding materials (e.g., a moldable tungsten impregnated plastic). Those skilled in the art will know how to design the body 103 to include a sufficient amount of one or more selected radiation-shielding materials in view of the amount and kind of radiation expected to be emitted in the cavity and the applicable tolerance for radiation exposure to limit the amount of radiation that escapes the assembly 101 through the sidewall 115 to a desired level.

One end of the body 103 may define a first opening 121 to the cavity 117 and a second end of the body 103 may define a second opening 123 to the cavity 117, as shown in FIG. 3. The second opening 123 may be sized greater than the first opening 121. For example, the first opening 121 can be sized to prevent passage of the container C therethrough and yet permit passage of at least a tip of a needle (not shown) therethrough (e.g., a needle on a tapping point of a radioisotope generator). The body 103 shown in the figures, for example, includes an annular flange 127 extending radially inward from the sidewall 115 near the top of the sidewall. (As used herein the terms "top" and "bottom" are used in reference to the orientation of the assembly 101 in FIG. 3 but does not require any particular orientation of the assembly or position of component parts.) An inside edge 129 of the flange 127 defines the first opening 121, which may be a substantially circular opening. The flange 127 may have a chamfer 131 to facilitate guiding of the tip of a needle toward a pierceable septum (not shown) of the container C received in the cavity. The flange 127 may be integrally formed with the sidewall 115 or manufactured separately and secured thereto. The flange 127 may include a radiation-shielding material, as described above, to limit escape of radiation from the assembly 101. However, the flange 127 can be substantially transparent to radiation without departing from the scope of the invention. The second opening 123 may be sized to permit passage of a container C therethrough for loading and unloading of containers from the assembly 101.

Figure 5:
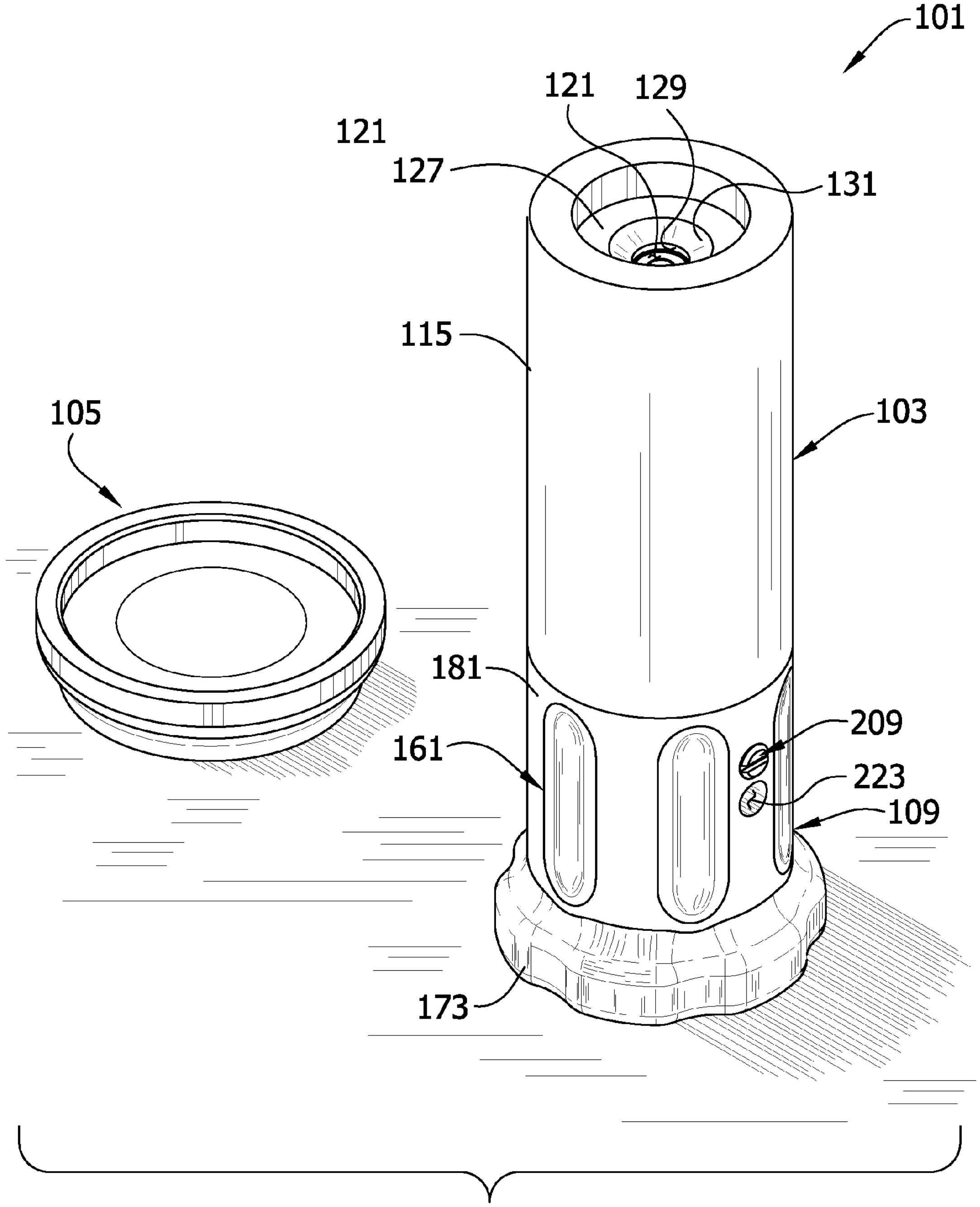
FIG. 5 is a perspective view of the assembly on a support surface with the cap removed from and lying next to a base of the assembly.
Figure 6:
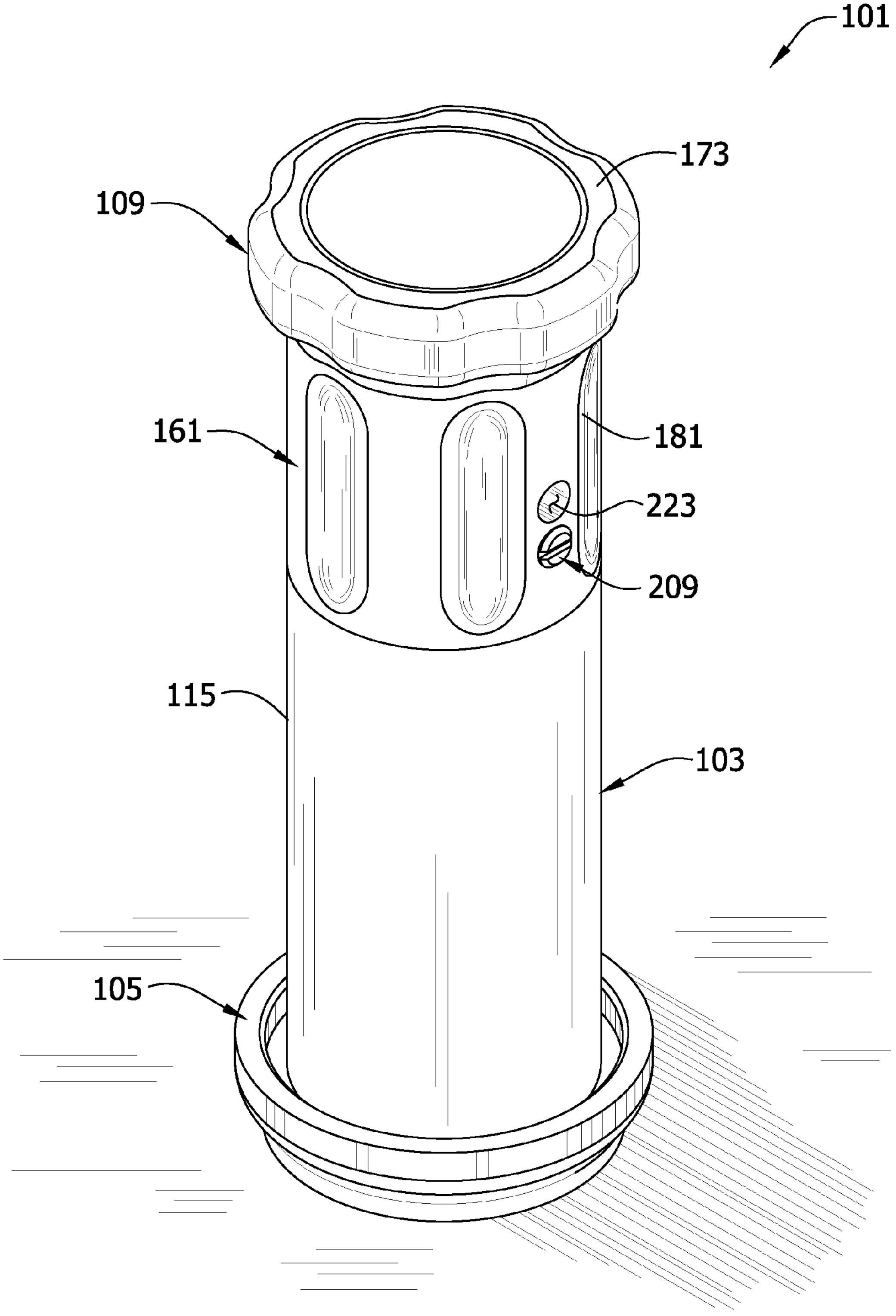
FIG. 6 is a perspective view of the assembly on a support surface.
Figure 6A:
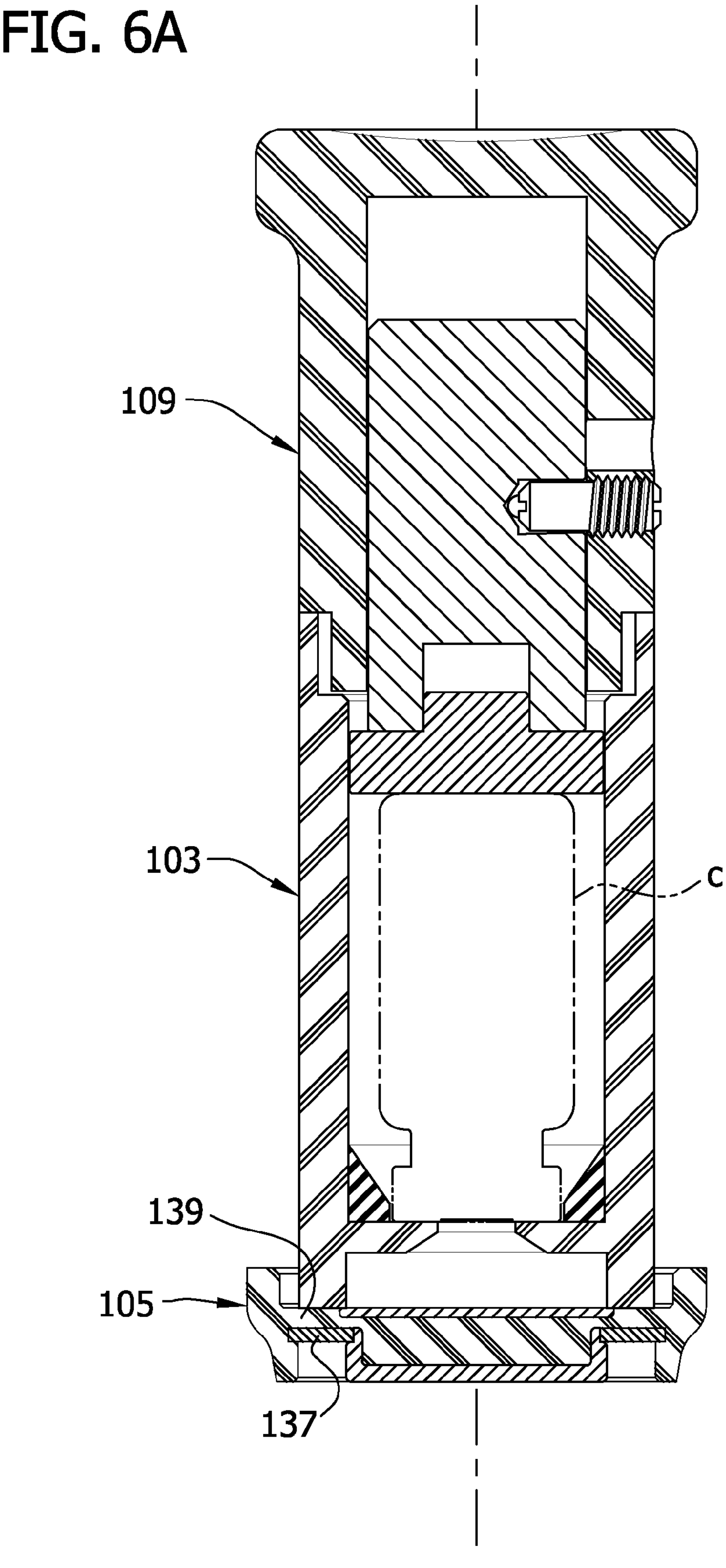
FIG. 6A is a vertical section of the assembly on the support surface.
Figure 7:
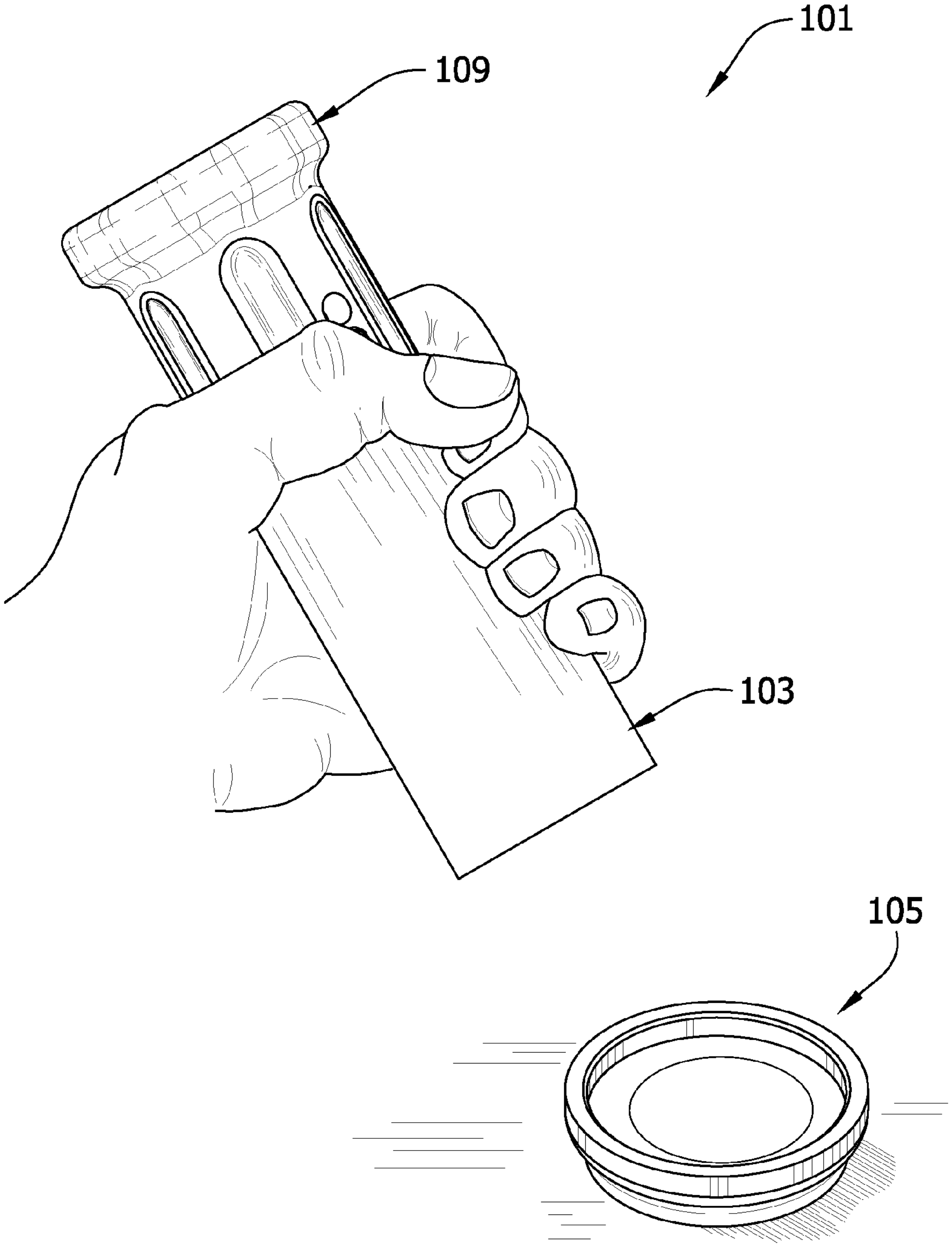
FIG. 7 is a perspective view of a person lifting a body of the assembly off of the cap using a single hand.
Figure 8:
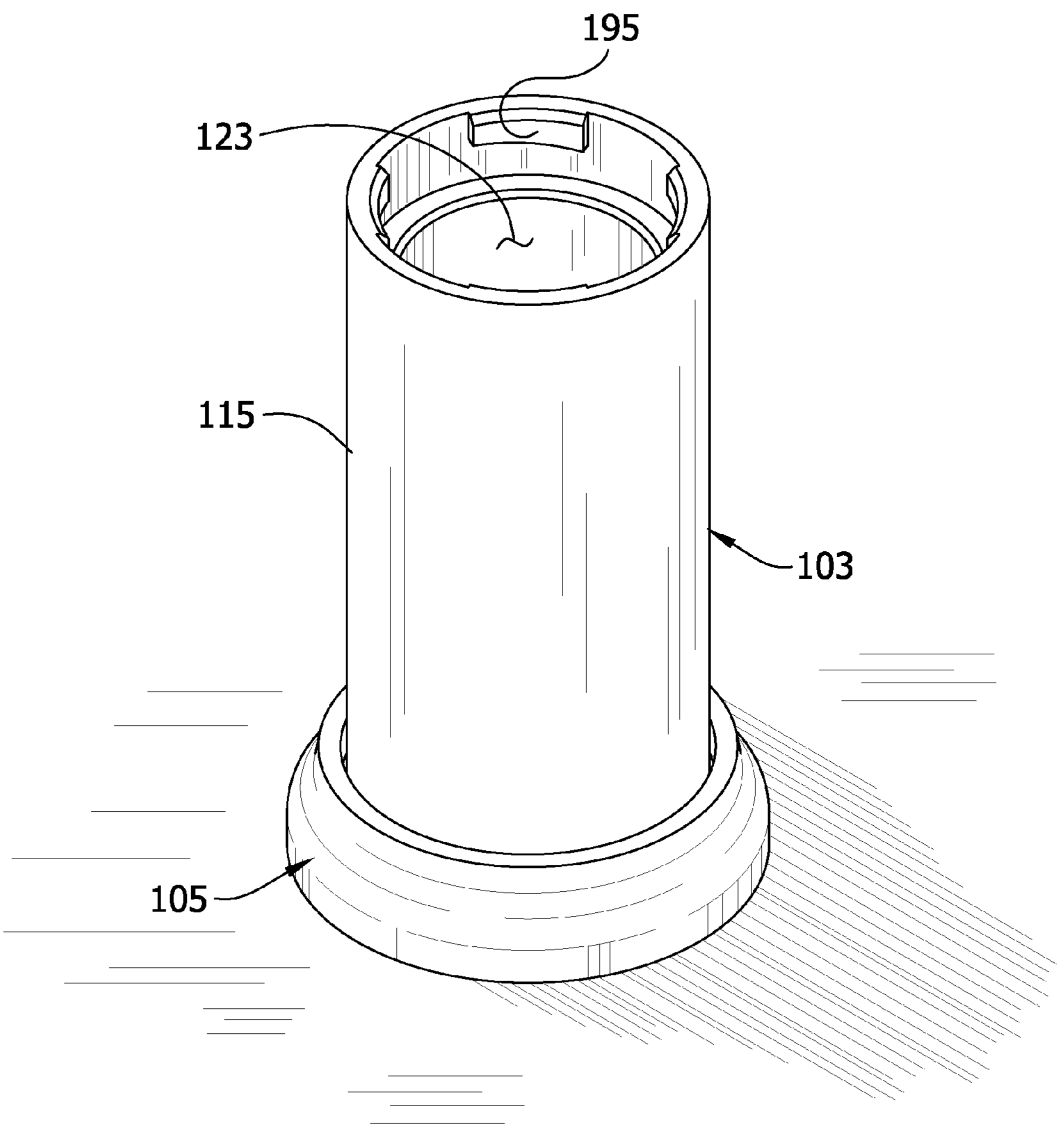
FIG. 8 is a perspective view of the body.

The cap 105 may be removed from the assembly 101 as shown in FIG. 5 so that the container C in the cavity 117 of the assembly can be fluidly interconnected with a radioisotope generator through the now exposed opening 121. Incidentally, "fluidly interconnected" or the like refers to a joining of a first component to a second component or to one or more components which may be connected with the second component, or a joining of the first component to part of a system that includes the second component so that a substance (e.g., an eluant and/or eluate) may pass (e.g., flow) at least one direction between the first and second components. The cap 105 of the embodiment shown in the figures is reversible. When the cap 105 is in a first orientation relative to the body 103 (shown in FIGS. 1 and 3), the cap may be releasably attached to the body. When the cap 105 is in a second orientation relative to the body 103 (e.g., inverted as shown in FIGS. 6 and 6A), the cap 105 may be adapted for non-attached engagement with the body 103. More specifically, FIGS. 6 and 6A show the cap in the same orientation as in FIGS. 1-3 while the body has been inverted relative to the cap and placed upside down on the cap. The configuration of the assembly 101 in FIG. 3 may be characterized by some to be convenient for carrying the container C of radioactive eluate in the cavity 117 from one place to another with less concern about the cap 105 accidentally falling off the body 103 and unnecessarily exposing people to radiation than if the cap 105 were simply set unattached on top of the assembly 101. The configuration of the assembly 101 in FIGS. 6 and 6A may be found to be convenient for storing the container C of radioactive eluate in an inverted position during idle time between the dispensing of eluate from the container C in the assembly into another container (e.g., a syringe) used downstream in the radiopharmaceutical preparation process. In addition, some users may find that orientation convenient because it allows a person to access the container C simply by lifting the body 103 off the cap 105 to expose the first opening 121. For example, the container C can be accessed by lifting the body 103 with a single hand as shown in FIG. 7, leaving the other hand free to perform another action (e.g., hold a syringe) in preparation for the dispensing process.

Figure 4:
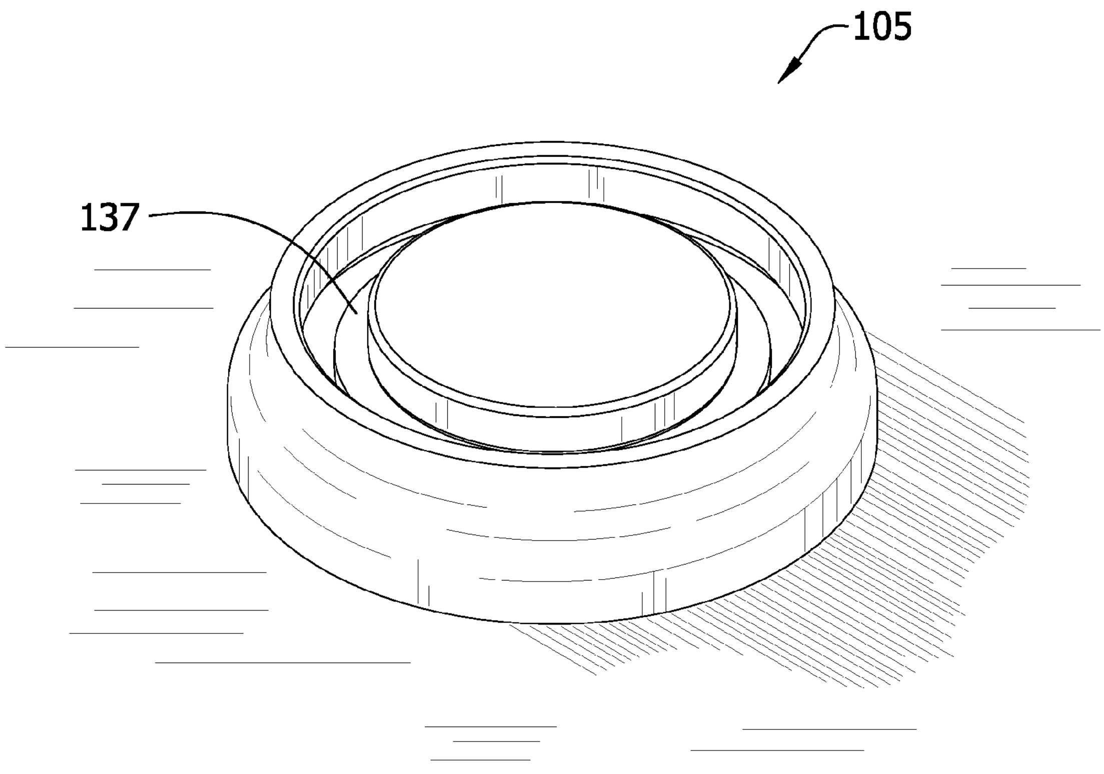
FIG. 4 is an enlarged perspective view of a cap of the assembly lying on a support surface.
Figure 4A:
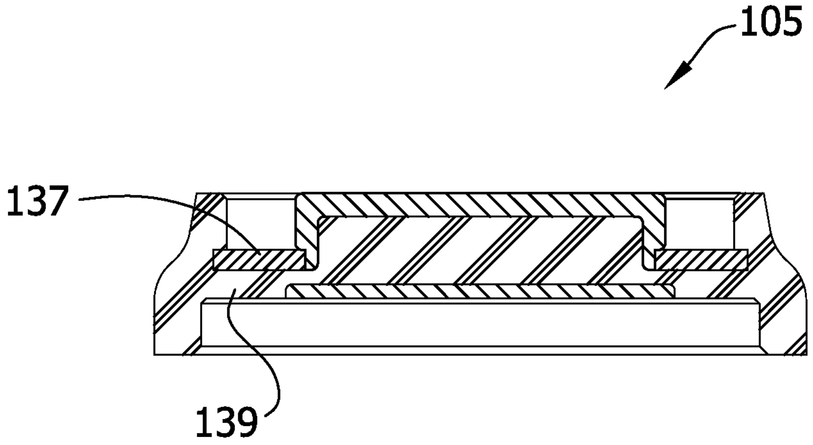
FIG. 4A is a vertical section of the cap.

There are a number of ways to design a cap 105 to be releasably attachable to the body 103 in the first orientation and adapted for non-attached engagement with the body 103 in the second orientation. The cap 105 shown in FIGS. 4 and 4A, for example, includes a magnetic portion 137 that attracts the body 103 when the cap is in the first orientation, thereby resisting movement of the cap 105 away from the body. In some embodiments, the body 103 may be constructed of a material (e.g., an alloy comprising one or more magnetic metals) that is attracted by the magnetic portion 137 of the cap 105. In other embodiments, the body 103 includes a material having a relatively weaker attraction or no attraction to the magnetic portion 137 of the cap 105 and an attracting element (not shown) made of a material that has a relatively stronger attraction to the magnetic portion (e.g., iron or the like) molded into or otherwise secured to the body to enable the magnetic portion of the cap to attract the body. When the cap 105 is in the second orientation, however, the attraction of the magnetic portion 137 of the cap to the body 103 is sufficiently attenuated (e.g., by an increase in distance between the body and the magnetic portion of the cap, magnetic "shielding", etc.) so that the weight of the cap is sufficient to freely separate the cap from the body when one of the body and the cap is urged away from the other. As shown in FIGS. 3 and 6A, for example, the cap 105 may be constructed so that the magnetic portion 137 thereof is positioned adjacent (e.g. in contact with) the body 103 when the cap engages the body in the first orientation (FIG. 3) and separated from the body (e.g., by a substantially non-magnetic material 139) when the cap engages the body in the second orientation (FIG. 6A). The cap and/or the body may be equipped with detents, snaps and/or friction fitting elements or other fasteners that are operable to releasably attach the cap to the base without use of magnetism in the first orientation and which are substantially inoperable to attach the cap to the body in the second orientation without departing from the scope of the invention.

The cap 105 may be adapted to limit escape of radiation emitted in the cavity 117 from the assembly 101 through the first opening 121 when the cap is releasably attached to the body 103 in the first orientation and when the cap is in non-attached engagement with the body in the second orientation. For example, the cap 105 may include one or more radiation-shielding materials (not shown), as described above. Those skilled in the art will be able to design the cap 105 to include a sufficient amount of one or more radiation-shielding material to achieve the desired level of radiation shielding. In order to reduce costs, radiation-shielding materials may be positioned at the center of the cap 105 (e.g., in registration with the first opening 121 when the cap is positioned relative to the body as shown in FIGS. 3 and 6), and the outer circumference of the cap may be made from less expensive and/or lighter-weight non-radiation-shielding materials, but this is not required for practice of the invention.

The collar 107 (which, in some case, may be referred to as a container "locator" of sorts) may be placed in the cavity 117 to guide the container C into a desired and/or predetermined position as it is loaded into the cavity. For example, the collar 107 may be press fit into the cavity 117 so that the friction between the body 103 and the collar tends to hold the collar in the cavity. In other embodiments, the collar 107 may be secured to the body 103 by an adhesive or other suitable method of attachment. In yet other embodiments, the collar 107 may be an integral component of the body 103. The collar 107 may be adapted to assist in aligning the top of a container C with the first opening 121 of the body 103 to facilitate piercing of the container's septum by the tip of a needle on a radioisotope generator when the container is disposed in the cavity 117 of the body 103. In some embodiments, alignment of the top (e.g., mouth) of the container C with the first opening 121 may require the top of the container to be centered in the cavity 117, but the predetermined position to which the collar is constructed to guide the container can vary depending on the configuration of the particular assembly.

Figure 17A:
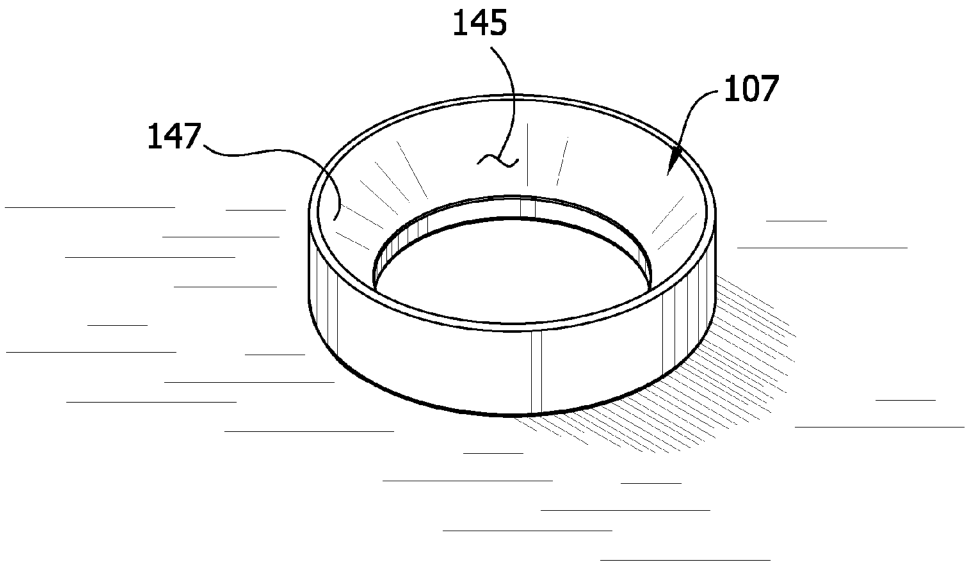
FIG. 17A is a perspective view of a collar.
Figure 17B:
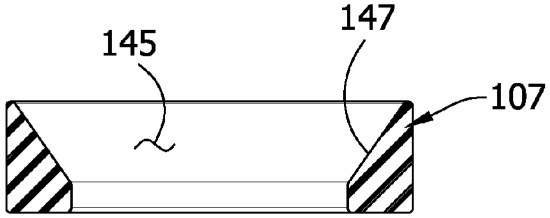
FIG. 17B is a vertical section of the collar.
Figure 18A:
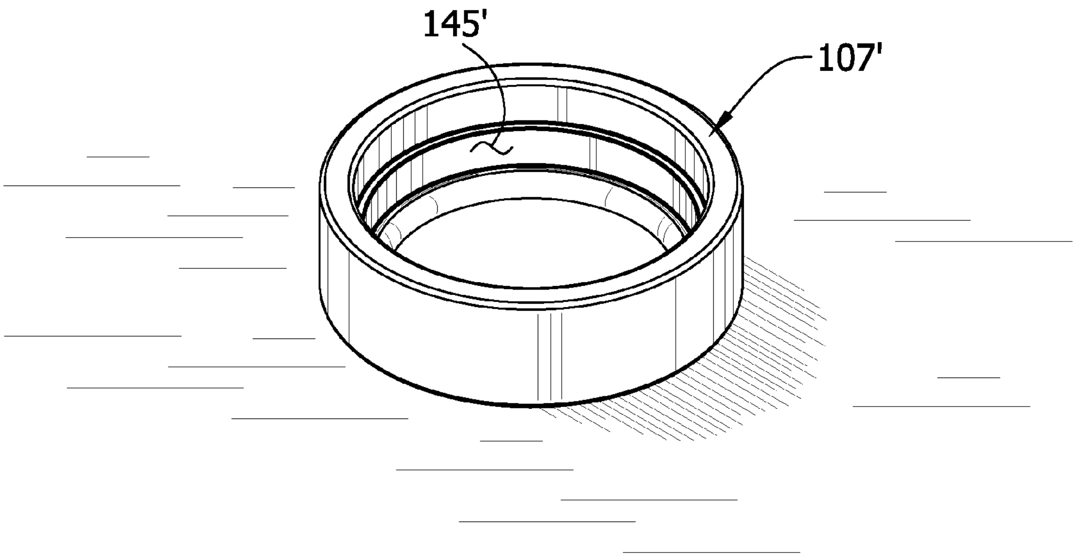
FIG. 18A is a perspective view of another collar.
Figure 18B:
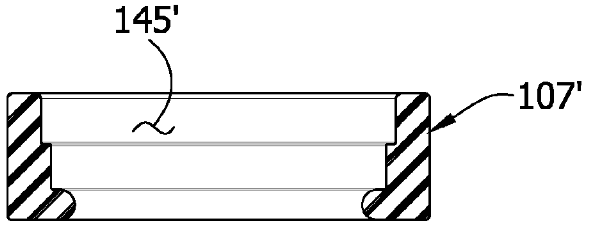
FIG. 18B is a vertical section of the collar of FIG. 18A.

In the embodiment shown in FIG. 3, the collar 107 may be position in the cavity 117 adjacent the first opening 121 and opposite the second opening 123. Referring to FIG. 3 in conjunction with FIGS. 17A-B, the collar 107 has an aperture 145 spanning between first and second sides of the collar. A first aperture opening is defined at the side of the collar 107 facing the second opening 123 of the body 103, and a second aperture opening of the collar is defined at the side of the collar facing the first opening 121 of the body. The aperture 145 may receive at least a part of a container C as it is loaded into the cavity through the second opening 123 in the body 103. The aperture 145 is shaped so that the collar 107 guides or steers the container C toward the predetermined position upon engagement of the inside of the collar 147 with the leading end of the container as it is being loaded into the cavity 117. For instance, the first opening of the aperture 145 may be greater in size than the second opening of the aperture. The aperture 145 of the collar 107 shown in FIGS. 17A and 17B is somewhat analogous to a funnel in that it is tapered. The collar 107 can have a different shape (e.g., be shaped to define a stepped or tiered aperture 145' like the collar 107' shown in FIGS. 18A and 18B) without departing from the scope of the invention. The top of the aperture 145 defined in the collar 107 may be shaped to engage or at least generally interface with about the top third of a cap 119*a* of the container C being held in the cavity 117, as shown in FIG. 3. It should be noted that other embodiments of the top of the aperture 145 may be shaped to engage or at least generally interface with more or less than about the top third of the cap 119*a* on the container C. As illustrated, the collar 107 is operable to align (e.g., center) a septum of the container C with the first opening 121. The portion of the container C that is engaged by the collar may be varied in size and/or location without departing from the scope of the invention.

The collar 107 may be constructed of any appropriate material, such as a relatively inexpensive, lightweight, durable, low-friction material (e.g., polycarbonate). Moreover, the material may be substantially transparent to radiation. Indeed, since the body 103 of the assembly 101 generally includes radiation-shielding material, it may be undesirable to include radiation-shielding material in the collar 107 as well. In other words, the collar 107 of some embodiments may include radiation-shielding material only to the extent such radiation-shielding material is needed to attain a desired and/or required level of radiation protection for a specific application. Use of a material that is transparent to radiation for the make-up of the collar 107 may beneficially allow the weight and/or cost of the assembly to be reduced. Those skilled in the art will appreciate that the cost of machining a cylindrical cavity 117 in the body 103 may tend to be less than the cost of machining a cavity in the body shaped to form one or more positioning structures (e.g., shoulders) on the body to be used to guide containers in the same manner as the collar 107. Radiation-shielding materials can be difficult to machine and may tend to be more expensive than other materials that may be used for the collar 107. Further, the overall weight of the assembly may be reduced by making the collar 107 out of relatively lighter-weight material instead of relatively heavier-weight materials that may be used to make the body 103. It is understood, however, that the body 103 can be manufactured by any method (e.g., molding) without departing from the scope of the invention. Moreover, use of other types of locators instead of a collar is considered to be within the scope of the invention. Still further, some embodiments of the invention have collars that include radiation-shielding materials.

Figure 12:
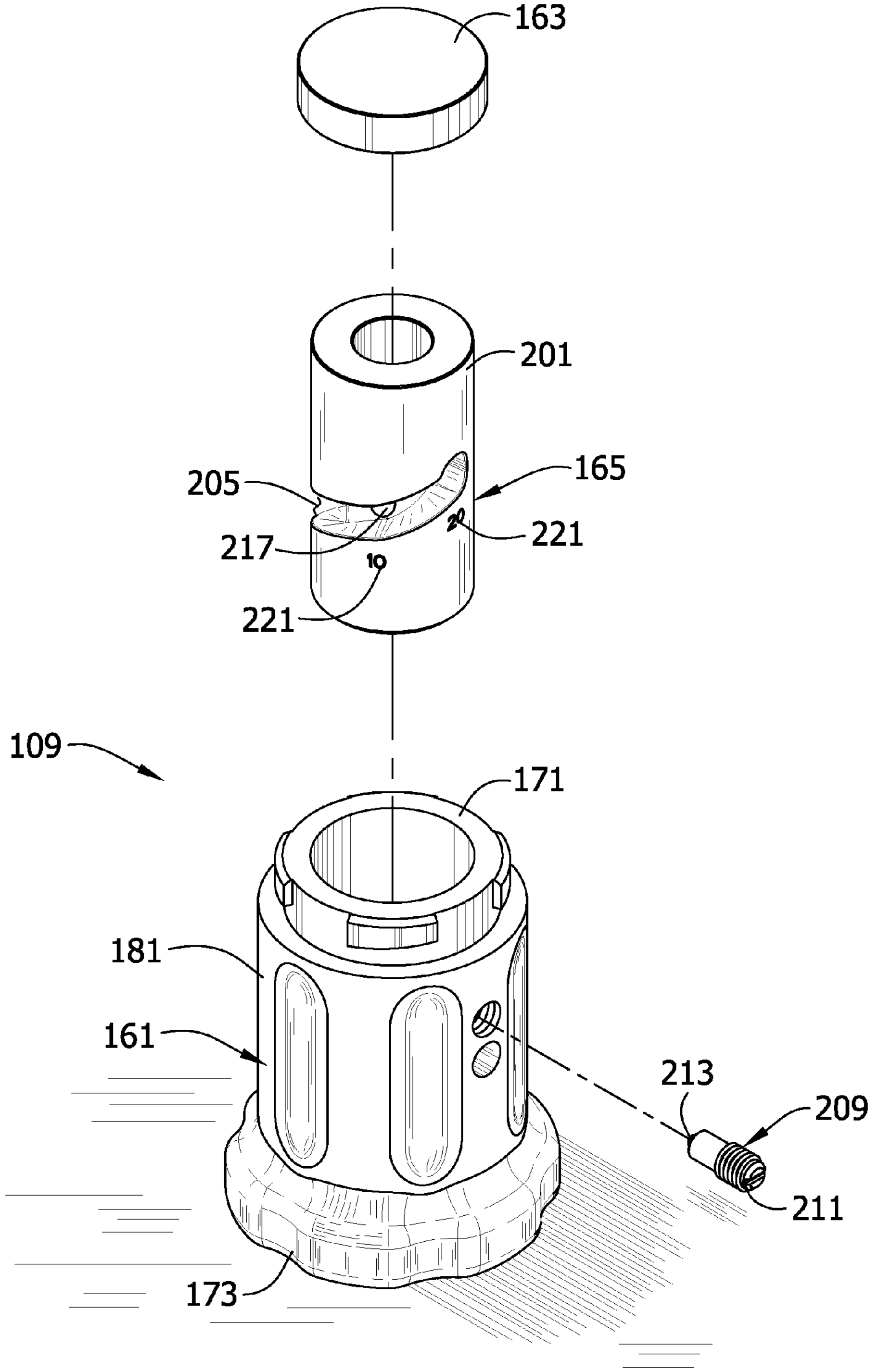
FIG. 12 is an exploded perspective view of the base.
Figure 13:
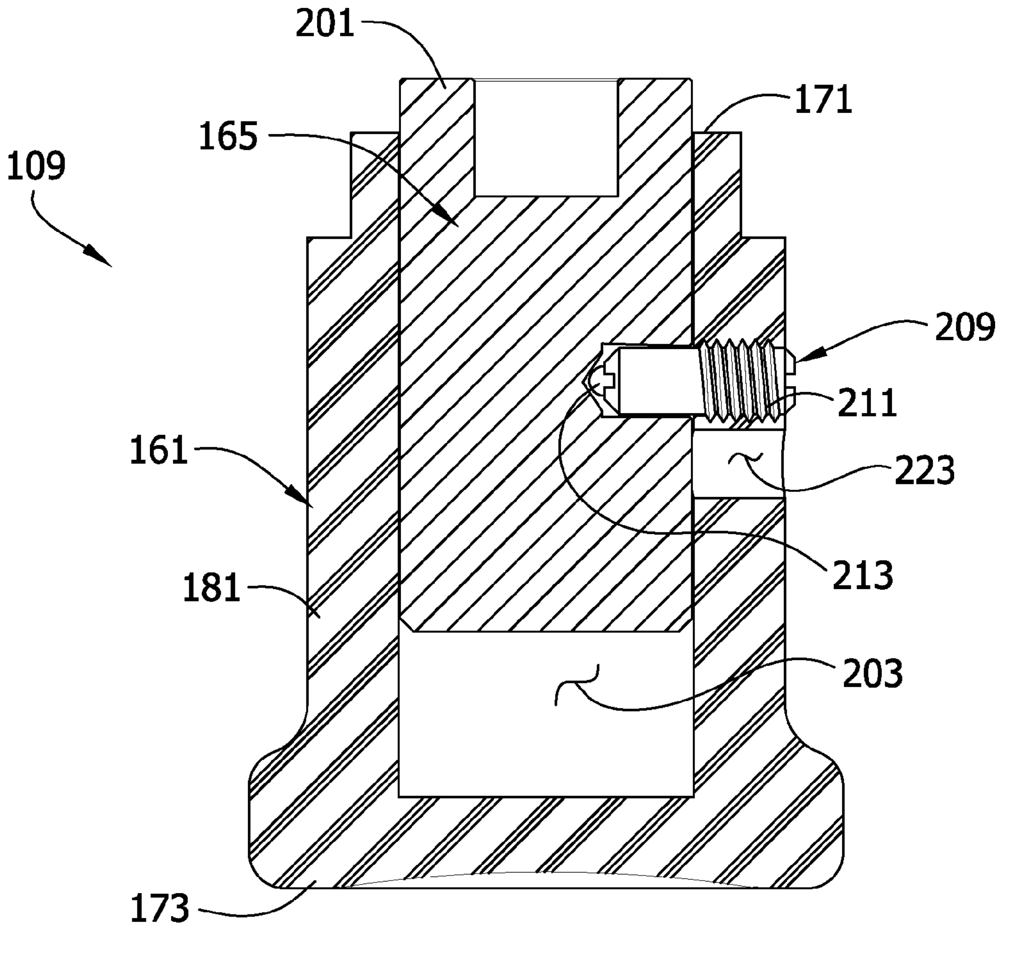
FIG. 13 is a vertical section of the base of FIG. 12.

The base 109 may be releasably secured to the body 103. As best seen in FIGS. 12 and 13, the base 109 shown in the figures includes an extension element 161, a base shielding element 163, and a spacer system 165. The extension element 161 may be a generally tubular structure having an open top end 171 adapted for making a releasable connection to the body 103 (e.g., adjacent the second opening 123) and a closed bottom end 173. The extension element 161 may be constructed of one or more relatively inexpensive, lightweight, durable materials, such as high-impact polycarbonate materials (e.g., Lexan®), nylon, and the like. The bottom end 173 of the extension element 161 may be outwardly flared to provide a wider footprint for added stability when the assembly 101 is placed base down on a work surface (as shown FIG. 1). The extension element 161 may be used to lengthen the assembly 101, including the combined length of the body 103 and the base 109. For example, the extension element 161 may include a circumferential sidewall 181 generally corresponding to the circumferential sidewall 115 of the body 103 as shown in FIG. 1. As those skilled in the art know, some radioisotope generators are designed to work with a shielding assembly having a particular minimum length (e.g., six inches). The extension element 161 may be used in combination with a body 103 that would otherwise be too short for a particular radioisotope generator to satisfy the minimum length requirement of that generator. The base extension element 161 may be transparent to radiation because other parts of the assembly 101 can be designed to achieve the desired level of radiation shielding. Use of a relatively lighter-weight (e.g., non-radiation-shielding) extension element 161 to provide the required length allows the assembly 101 to be lighter and/or less expensive compared to a similar assembly that is constructed of relatively heavier-weight and/or more expensive materials (e.g., radiation-shielding materials) along the entirety of the minimum length required by a particular radioisotope generator. There may be a void (illustrated herein as a receptacle 203) in the base for additional weight reduction. For example, in one embodiment of the invention, the overall weight is no more than about 4 pounds. In another embodiment, the weight is no more than about 3 pounds. Use of the relatively lightweight extension element 161 may also shift the center of gravity of the assembly 101 toward the end of the body 103 defining the first opening 121, making the assembly more stable when inverted for use as a dispensing shield (See, FIG. 6).

Figure 9:
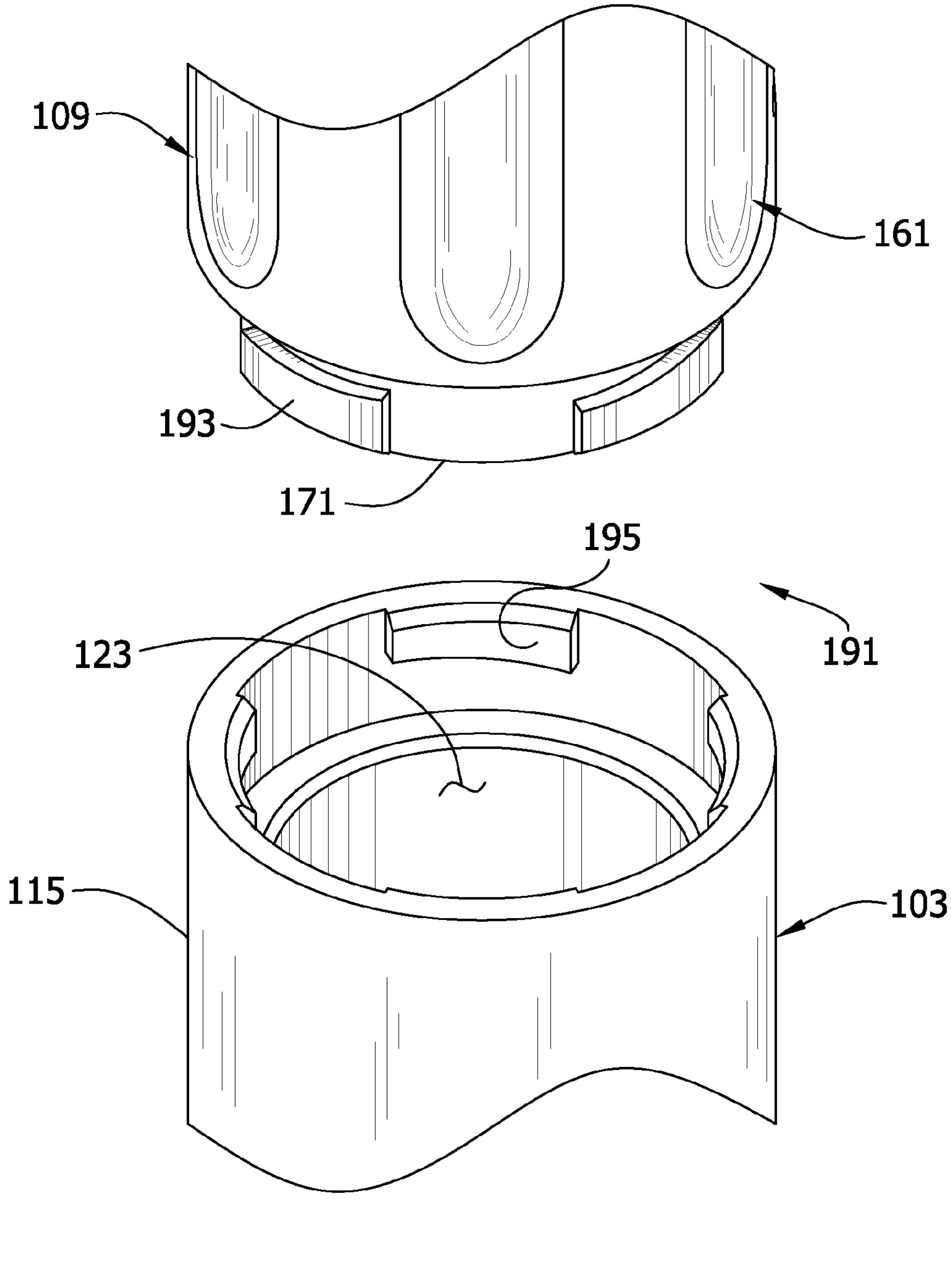
FIG. 9 is an enlarged fragmentary perspective view of a base and the body as they are about to be connected together.

The base 109 may be adapted for being releasably attached to the body 103 by a quick turn connection 191 (e.g., a connection in which the base may be secured to and/or released from the body by twisting the base relative to the body by no more than about 180 degrees) as is shown in FIG. 9. When the base 109 is twisted to release it from the body 103, the quick turn connection 191 may be adapted to provide a positive indication that the base has been twisted far enough relative to the body to permit the assembly 101 to be opened. By enabling separation of the base 109 from the body 103 by twisting the base through a relatively small angle relative to the body (e.g., about 45 degrees in the illustrated embodiment) and/or providing a positive indication that the assembly 101 can be opened by pulling the base away from the body, some embodiments of the invention may help reduce the risk of accidentally dropping the base (and perhaps letting a container filled with and/or contaminated by radioactive material fall out of the body) in the course of opening the assembly, such as might occur with a conventional shielding assembly if a worker adjusts his or her grip on the assembly to twist the base some more when, unbeknownst to the worker, the base has already been twisted far enough to release of the base from the body.

Referring to the embodiment shown in FIG. 9, for example, the quick turn connection 191 attaching the base extension element 161 and body 103 may be a "bayonet" type connection. The base extension element 161 may include a plurality of connecting elements 193 (e.g., lugs, threads, or the like) adapted for establishing a connection with a corresponding plurality of connecting elements 195 on the bottom end of the body 103. In one embodiment of the invention, the contact angle "α" (FIG. 10C) between corresponding connecting elements 193, 195 may be selected to provide a secure connection that makes it unlikely that the assembly 101 will be unintentionally opened as it is jostled about during handling and/or that makes it unlikely that the quick connection 191 will jam when someone tries to open the assembly.

Figure 10A:
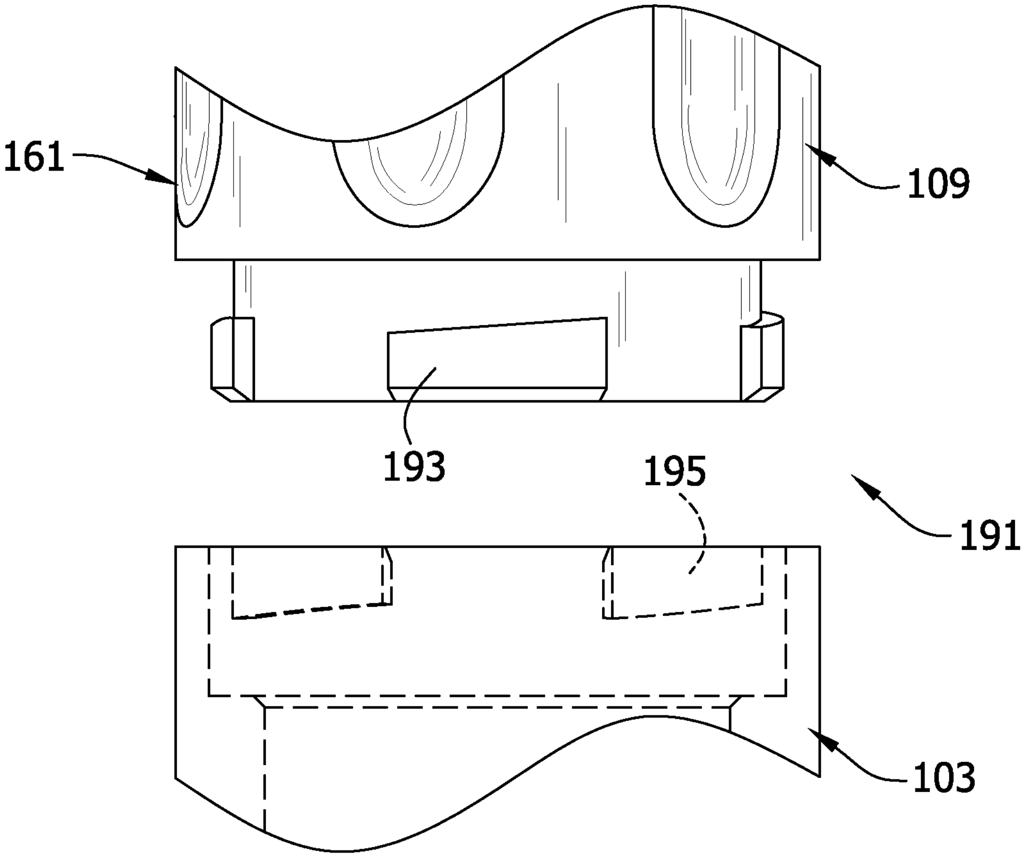
FIGS. 10A-10C are fragmentary schematics of the body and base illustrating an exemplary connection sequence.
Figure 10B:
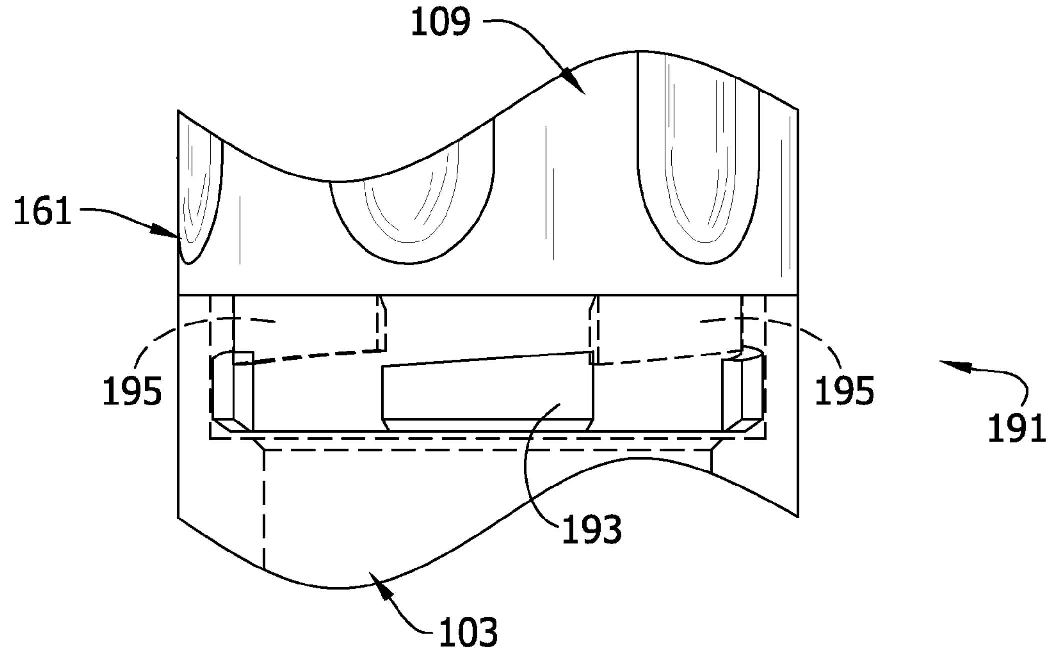
Figure 10C:
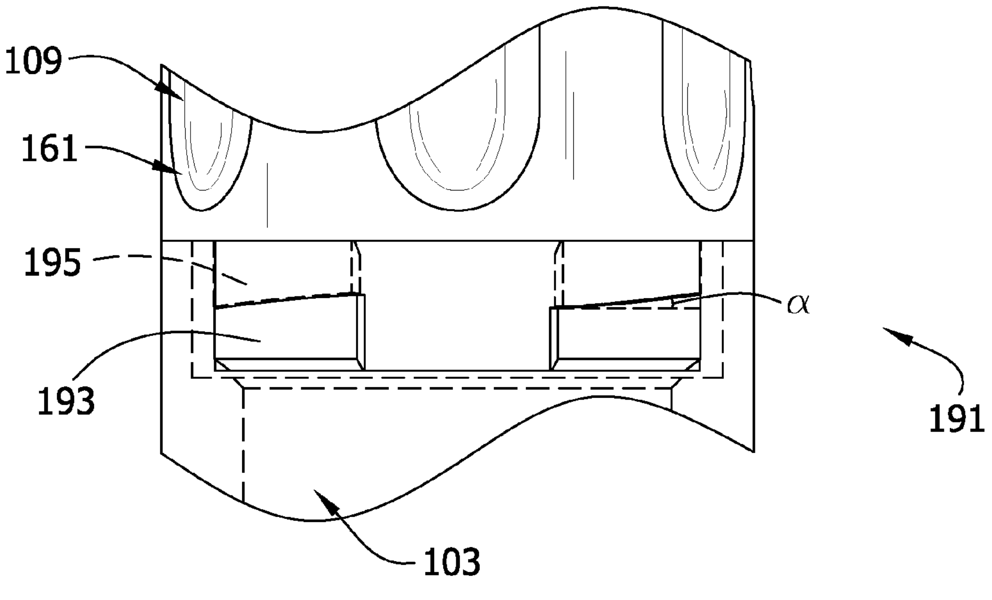
Figure 10D:
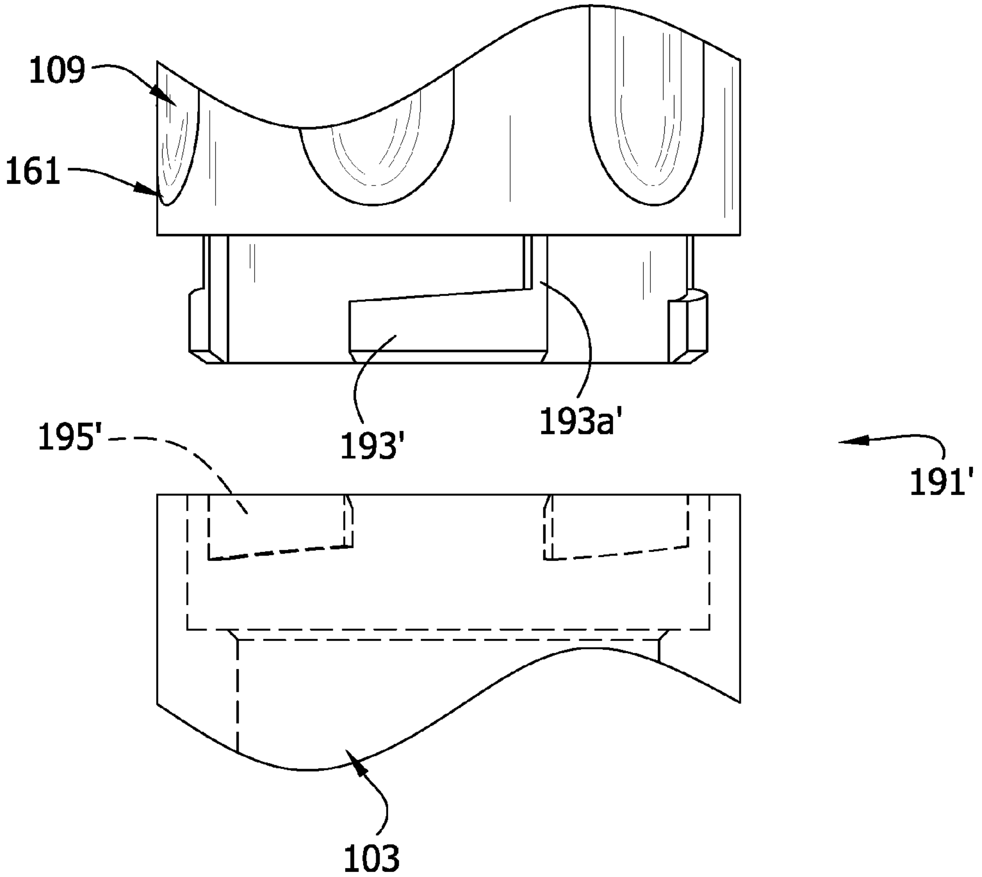
FIG. 10D is a fragmentary schematic of a body and base having a modified connection structure.

Referring to FIGS. 10A-10C, for instance, the contact angle "α" between the lugs 193 on the base extension element 161 and the mating lugs 195 on the body 103 may range from a relatively less steep angle that is empirically demonstrated to allow separation of the base 109 from the body without jamming to a relatively steeper angle that is about equal to the arctangent of the coefficient of friction between the mating connecting elements, both of which may vary depending on the materials used to form the connecting elements. As the coefficient of friction decreases, the contact angle "α" may be made less steep. In some embodiments, the coefficient of friction may be between about 0.1 to about 0.2. In other embodiments, the coefficient of friction is between about 0.12 and about 0.15. In still other embodiments, the coefficient of friction is about 0.12. The contact angle "α" may range from about 2 degrees to about 10 degrees in some embodiments. In other embodiments, the contact angle "α" may range from about 5 degrees to about 10 degrees. It is understood that a quick turn threaded connection (e.g., a multi-start threaded connection) between the body 103 and the base 109 can be provided with substantially the same contact angles discussed with reference to the bayonet connection 191 to reduce the risk of unintentional opening of the assembly and to reduce the likelihood of jamming when someone tries to open the assembly 101. Incidentally, some embodiments of the invention may exhibit contact angles and/or coefficients of friction that fall outside of the ranges described above.

The quick turn connection 191 shown in FIGS. 9-10C may provide a positive indication when the base 109 has been rotated sufficiently relative to the body 103 to permit opening of the assembly 101 by limiting further rotation of the base when the base is capable of being separated from the body. For example, the lugs 193, 195 may be adapted to function as stops when the base 109 has been rotated far enough to open the assembly 101. Referring to FIGS. 10A-10C, for example, in one embodiment, the generally trapezoidal lugs 193, 195 on the base 109 and body 103 may be sized and spaced so that the lugs on the base may pass between the lugs on the body (FIGS. 10A and 10B). The quick turn connection 191 may be established by rotating the base 109 relative to the body 103 to cause the lugs 193, 195 to engage one another as shown in FIG. 10C. As the base 109 is rotated in the opposite direction to open the assembly 101, the lugs 193, 195 reach a point at which the lugs on the base may pass between the lugs on the body. At that point (FIG. 10B), the lugs 193 on the base 109 abut the lugs 195 on the body 103, thereby limiting the amount of rotation of the base that is possible. When a person opening the assembly 101 feels the lugs 193, 195 contact (e.g., "bump into") each other, he or she knows that the base 109 can be separated from the body 103 without any additional rotation of the base relative to the body. FIG. 10D shows another embodiment of a quick turn connection 191' in which the lugs 193' on the base 109' include ribs 193*a*' extending their taller side. There may be clearance between the lugs 193', 195' (except for the ribs 193*a*'), but the lugs 195' bump into the ribs 193*a*' to provide a positive indication that the assembly 101 can be opened.

The base shielding element 163 may be connected (either directly or indirectly as shown in FIG. 3) to the base extension element 161 so that connection of the base extension element to the body 103 interconnects the base shielding element to the body. The base shielding element 163 may be operable to limit escape of radiation emitted in the cavity 117 from the assembly 101 through the second opening 123 when the base extension element 161 is connected to the body 103. As shown in FIG. 3, for example, the base shielding element 163 may include a plug adapted to be slidably received by the second opening 123 of the body 103 into the cavity 117. The base shielding element 163 may be adapted to absorb and/or reflect radiation over an area that is substantially coextensive with the second opening 123, for example, by being configured as a plate having substantially the same shape and size as the opening. In some embodiments of the invention, the base shielding element may be adapted to substantially cover the second opening 123 without being received therein. The base shielding element 163 may include one or more radiation-shielding materials (not shown), as described above. Those skilled in the art will know how to design a base shielding element 163 to include a sufficient amount of one or more radiation-shielding materials to limit escape of radiation from the assembly 101 through the second opening 123 to a desired level.

The spacer system 165 may include an adjustable spacer 201, which may be at least partially received in the cavity 117 for selectively configuring the assembly 101 to hold a container selected from a set of containers including containers having different heights (e.g., different volumes). Referring to the embodiment shown in the figures, for example, the spacer 201 may be slidably mounted in the receptacle 203 in the base 109 (e.g., a substantially cylindrical receptacle in the base extension element 161). The receptacle 203 in the base 109 may be adjoin the second opening 123 into the cavity 117 of the body 103 when the base is secured to the body, thereby positioning the spacer 201 for slidable extension into and retraction out of the cavity 117. The base shielding element 163, which may define a support surface for the container C when it is received in the cavity 117, may be secured (e.g., by a threaded connection or other method of attachment) to or integral with the spacer 201. By selective positioning of the spacer 201 with respect to the first opening 121, the position of the base shielding element 163 relative to the first opening 121 of the body 103 can be changed to position the top of each of the containers C at substantially the same location relative to the first opening, notwithstanding their different heights.

The spacer 201 can be mounted in the assembly 101 in a variety of different ways. For example, the spacer 201 shown in the figures has a substantially cylindrical surface (e.g., outer surface) having a helical channel 205 defined therein. A detent 209 received in the channel 205 may be another component of the spacer system 165. In some embodiments, like the one shown in the figures, for instance, the detent 209 is associated with (e.g., mounted on) the base extension element 161, but in other embodiments the detent may be associated with other elements of the assembly 101. The detent 209 may be substantially fixed relative to the body 103 (e.g., when it is mounted on the base 109 while it is secured to the body). The detent 209 of the embodiment shown in the figures is a ball detent plunger. The ball detent plunger may be a threaded member 211 having a loosely captured ball 213 therein. A spring (not shown) may be positioned in the threaded member 211 to bias the ball 213 to a position in which a portion of the ball projects outward from an end of the threaded member. The threaded member 211 may be screwed into the base extension element 161 so that the end of the threaded member to which the ball 213 is biased is received in the channel 205. Other detents could be used instead, however. The detent 209 might be characterized as a cam, and the spacer 201 a cylindrical cam follower. The detent 209 engages one side of the helical channel 205 upon rotation of the spacer 201, producing movement (e.g., along an axis 197 of the cavity 117) of the spacer relative to the receptacle 203 in the base extension element 161. Depending on the direction of the rotation, the spacer 201 may be moved out of or into the receptacle 203, corresponding to translation farther into the cavity 117 and out of the cavity in the assembly 101, respectively.

Figure 11:
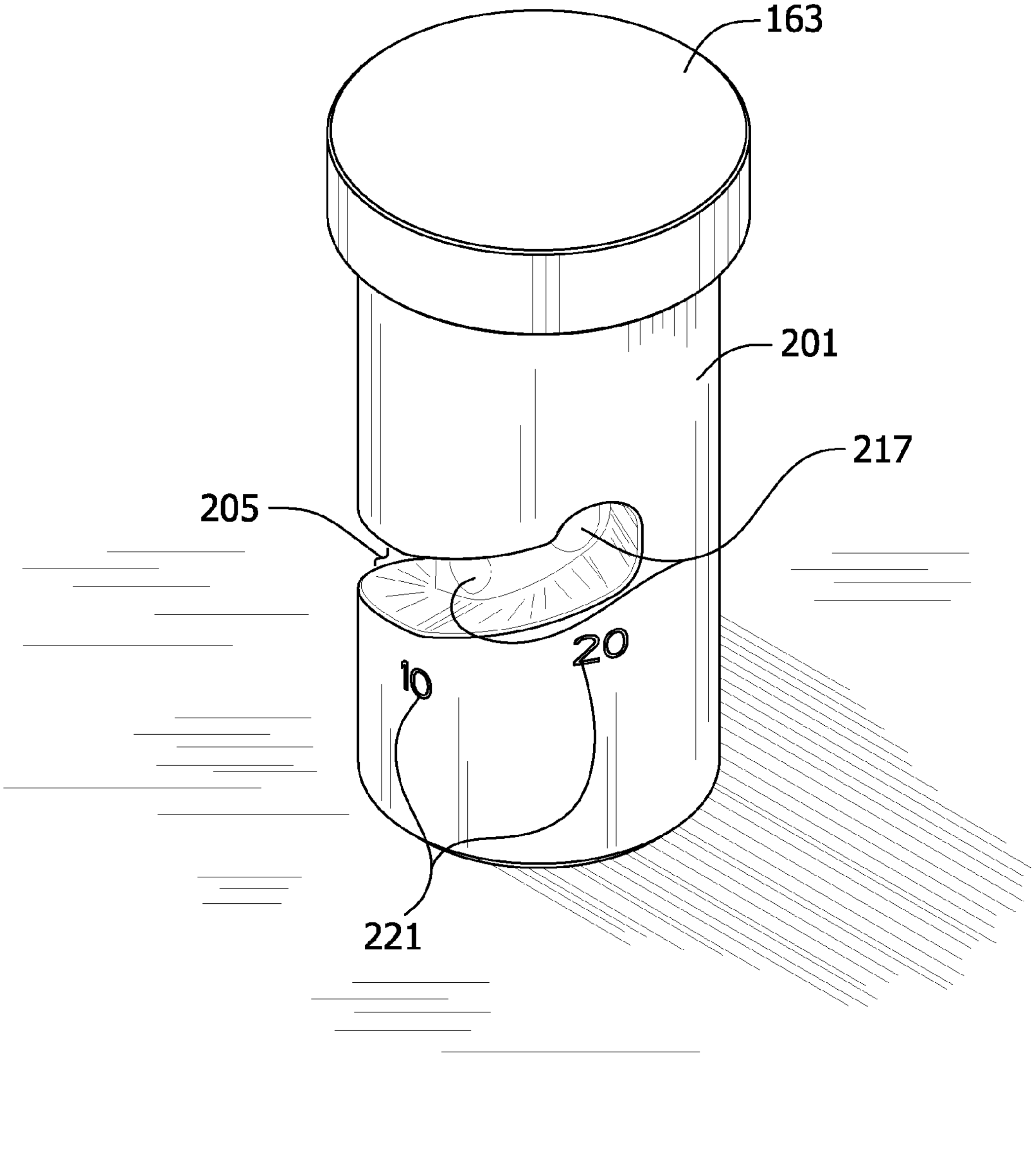
FIG. 11 is a perspective view of part of an adjustable spacer system.

Further, as shown in FIGS. 11 and 12, a plurality of recesses 217 adapted to engage the tip of the ball detent plunger 209 may be formed in the bottom of the helical channel 205. Only some of these recesses 217 are shown in the figures. Each of the recesses 217 may be aligned with the ball 213 of the ball detent plunger 200 when the spacer 201 is in one of the positions in which the spacer is adjusted for use with a particular one of the containers in the set. Thus, when the spacer 201 is moved into that position, the tip 213 of the ball detent plunger 209 may engage the respective recess 217 producing an audible click and/or tactile feedback to indicate that the spacer is in position. The recesses 217 may help to hold the spacer 201 in the selected position. Moreover, the spacer 201 may include markings 221 indicating the different heights of the containers positioned on the spacer relative to the helical channel 205 so that when the spacer is positioned for use with one of the containers, the corresponding marking is in a predetermined position in which it is visible while the other markings are obscured from view. In the embodiment shown in the figures, for example, a window 223 is formed in the base 109 below the ball detent plunger 209. Markings 221 are located on the outer surface of the spacer 201 at positions that are offset from (e.g., below) the respective recess 217 an amount corresponding to the amount of offset between the detent 209 and the window 223. When the ball 213 of the ball detent plunger 209 is engaged with one of the recesses 217, the corresponding marking 221 is visible in the window 223. The remaining markings 221 are covered by the base extension element 161 so workers can tell what kind of container is held in the assembly 161 by looking through the window 223 to view the corresponding marking 221, thereby obviating the need to open the assembly 101 to determine or confirm what kind of container is in the assembly.

Figure 14A:
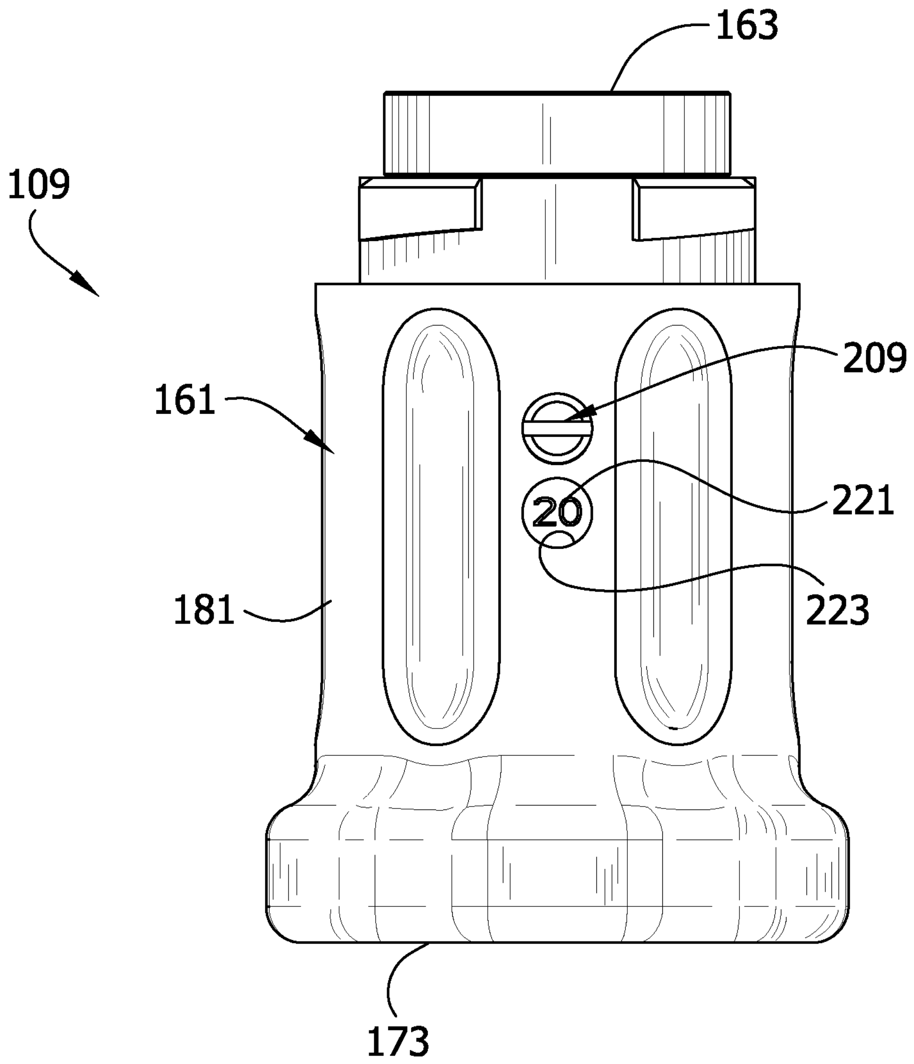
FIGS. 14A-14C are elevations showing a sequence of indexed movement of a spacer of the spacer system through positions adapted for use with three progressively shorter containers.
Figure 14B:
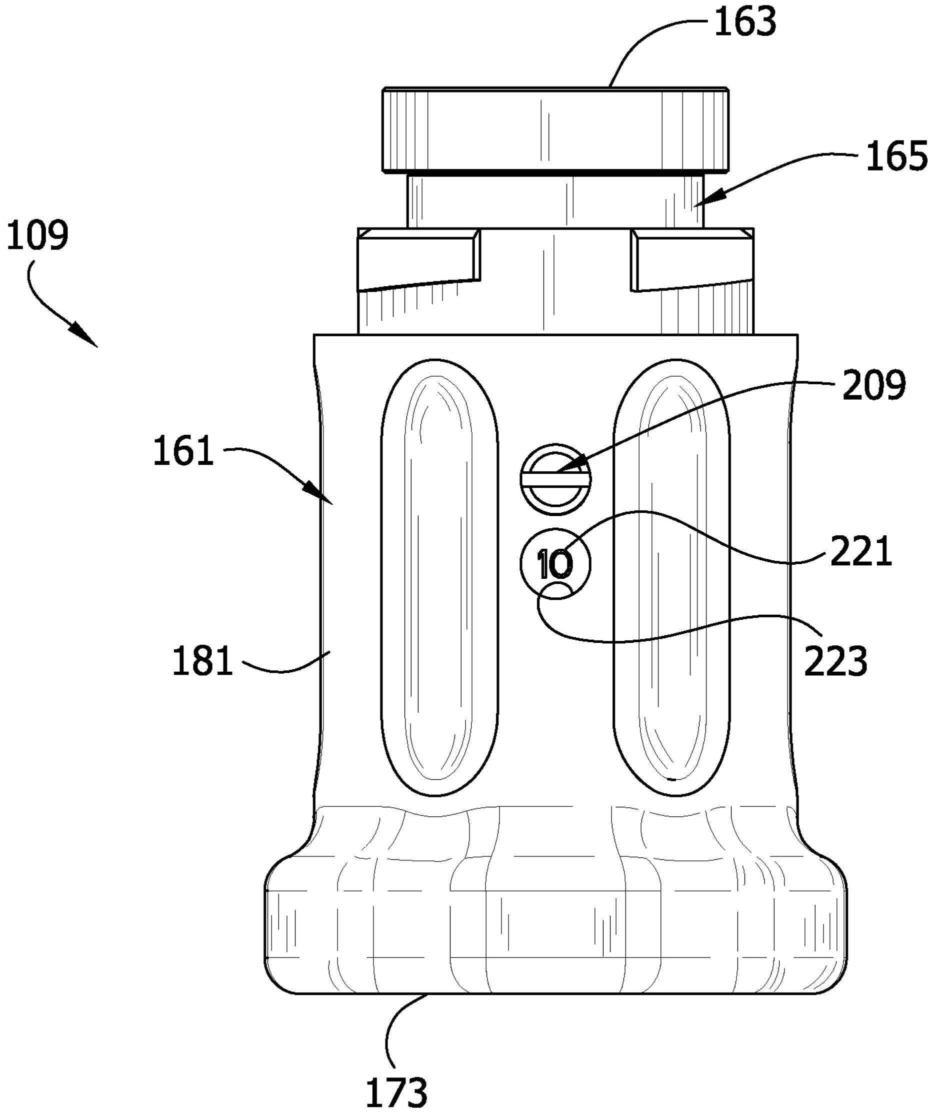
Figure 14C:
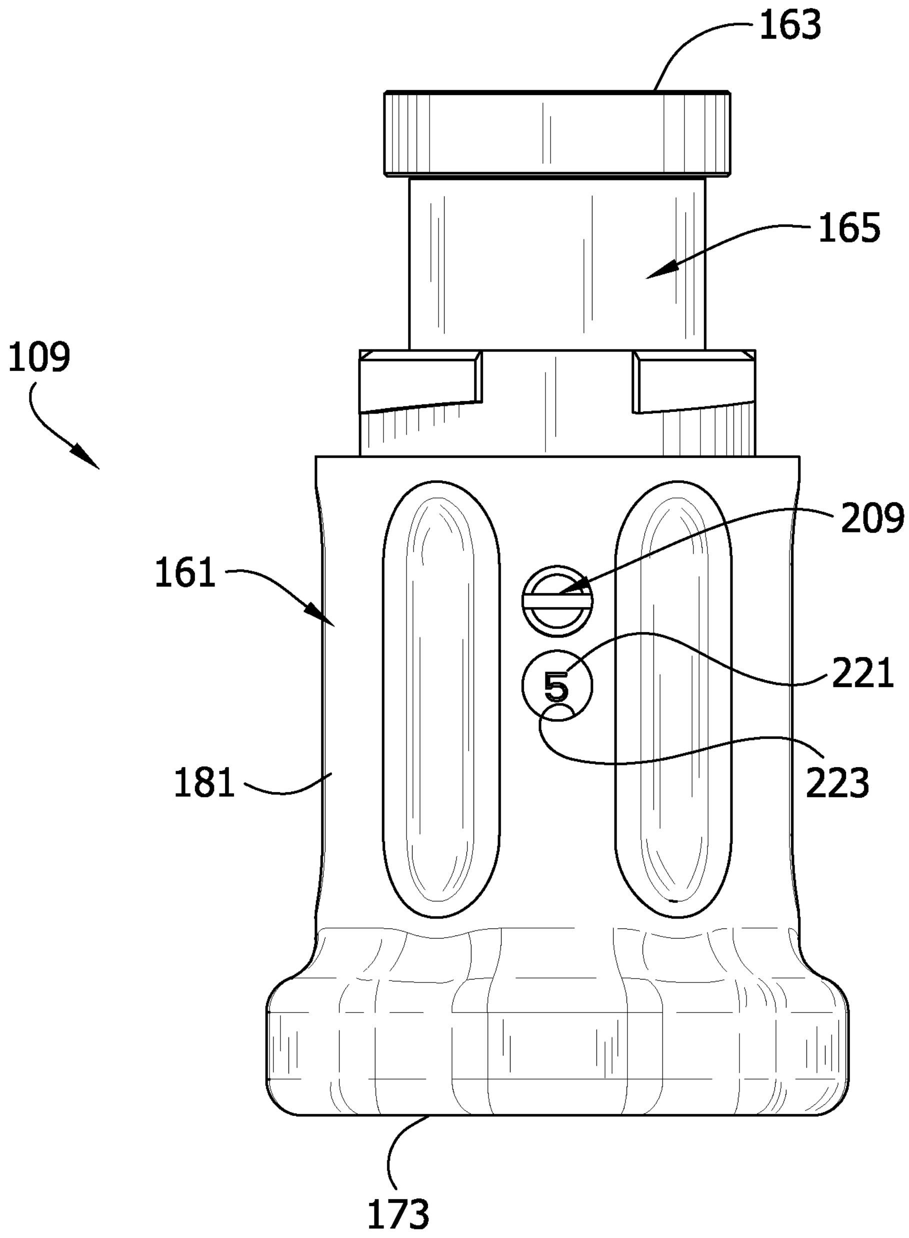
Figure 15A:
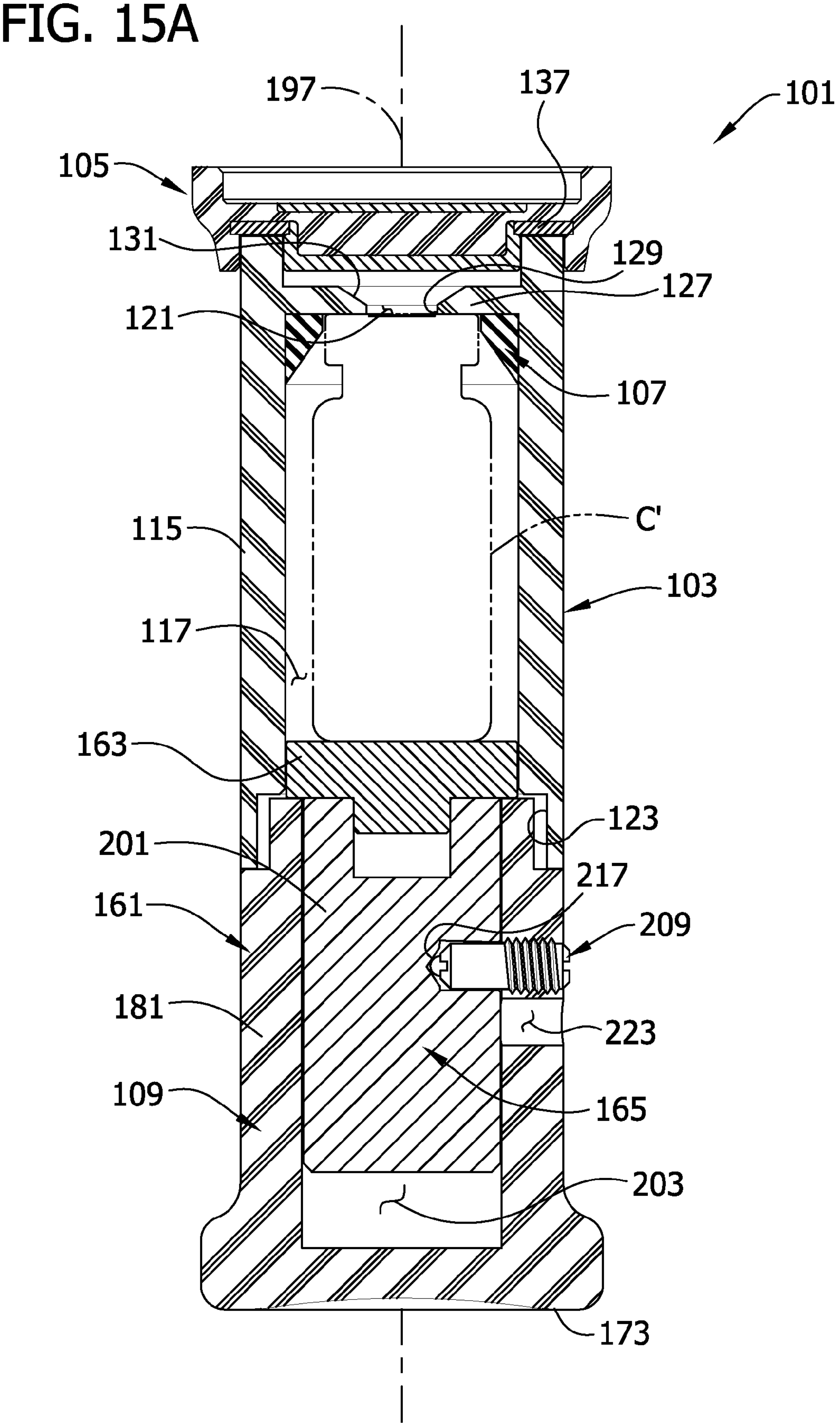
FIGS. 15A-15C are vertical sections of the assembly showing a sequence similar to the sequence of FIGS. 14A-14C in which the assembly is adapted to hold three progressively shorter containers (shown in phantom)
Figure 15B:
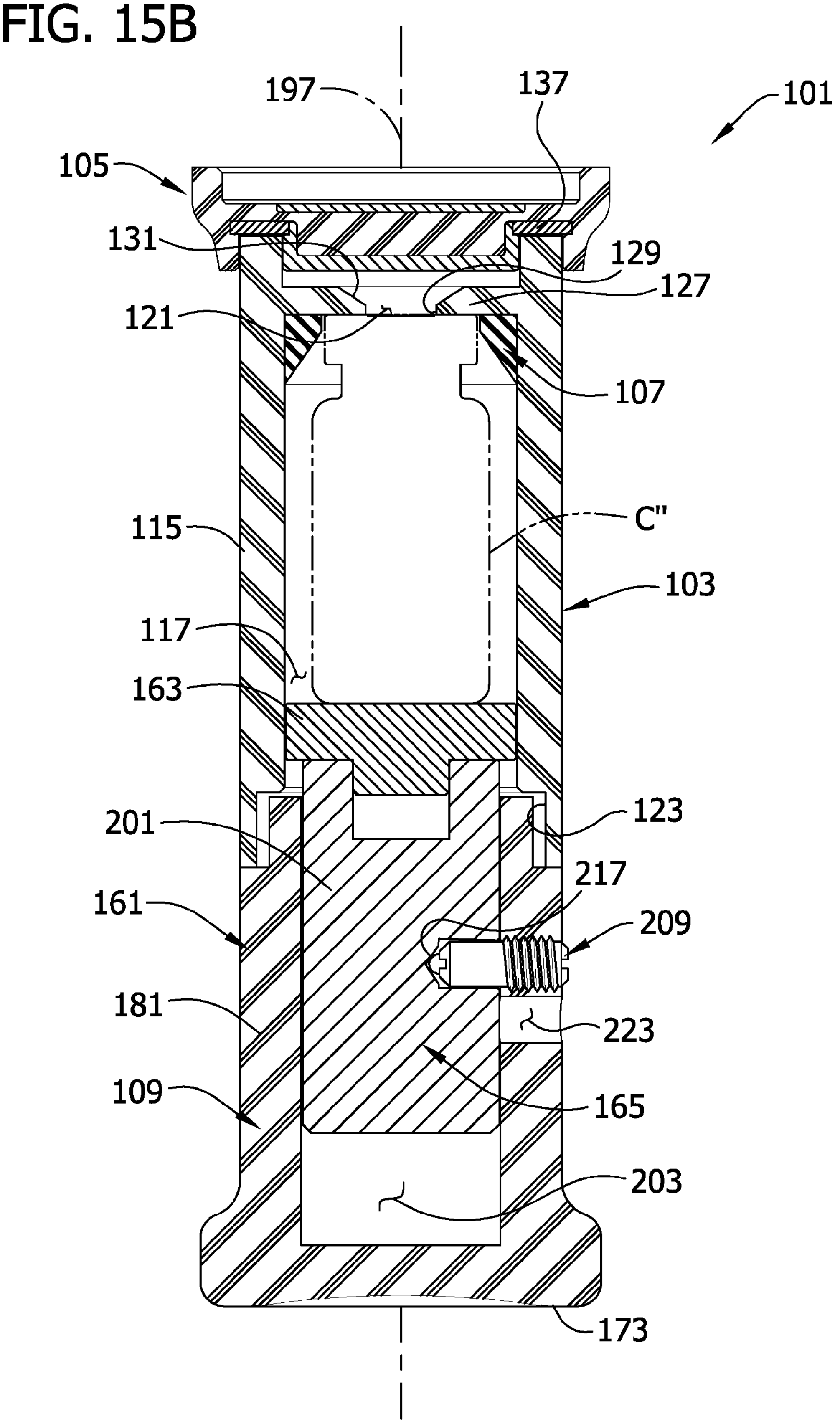
Figure 15C:
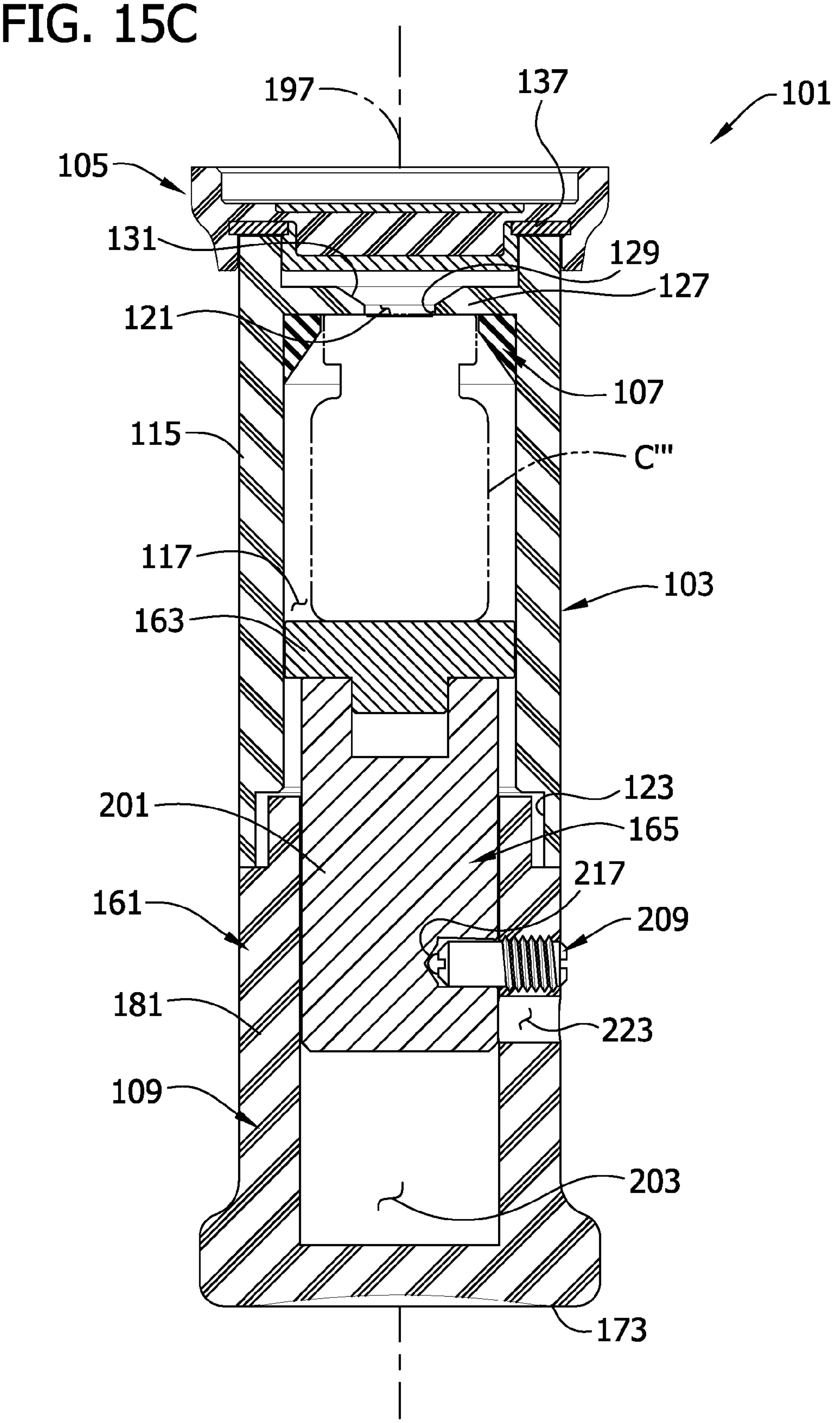

FIGS. 14A-14C and 15A-15C, for example, show a sequence of adjustment of the spacer system 165 for three containers C', C", C"' having three different heights. FIG. 14A shows the spacer 201 positioned for use with a 20 mL container C' (FIG. 15A), as indicated by the lowered position of the spacer and the marking 221 of "20" on the spacer that is visible in the window 223 through the base extension element 161. By twisting the spacer 201 relative to the base extension element 161 generally about a central longitudinal axis of the base extension element, the spacer can be raised to adapt the assembly to hold a shorter 10 mL container C" (FIG. 15B). The spacer 201 is shown in this position in FIG. 14B, in which the marking 221 "10" is visible in the window 223 and the spacer has been raised above its position in FIG. 14A. By twisting the spacer 201 even more, the spacer rides farther upward on the ball detent plunger 209 and is thereby raised to adapt the assembly 101 for use with an even shorter 5 mL container C"' (FIG. 15C). The spacer 201 is shown in this position in FIG. 14C, in which the marking 221 "5" is visible in the window 223 and the spacer has been raised above its position in FIG. 14B.

When the spacer 201 is adjusted to the desired position, the base 109 may be connected to the body 103 to enclose a container C in the assembly 101. FIGS. 15A-15C show a 20 mL, 10 mL, and 5 mL container C', C", C"' enclosed in the assembly 101, respectively, with the spacer 201 adjusted accordingly. As shown in FIGS. 15A-15C, the ball detent plunger 209 is engaged with one of the recesses 217 in the helical channel 205 at each of the three positions corresponding to one of the heights of the containers C', C", C"', providing indexed movement of the spacer 201 from a position suitable for use with one of the containers to a position suitable for use with a different one of the containers. It is understood that other constructions for adapting the assembly to work with containers having different heights may be used within the scope of the present invention.

Figure 16:
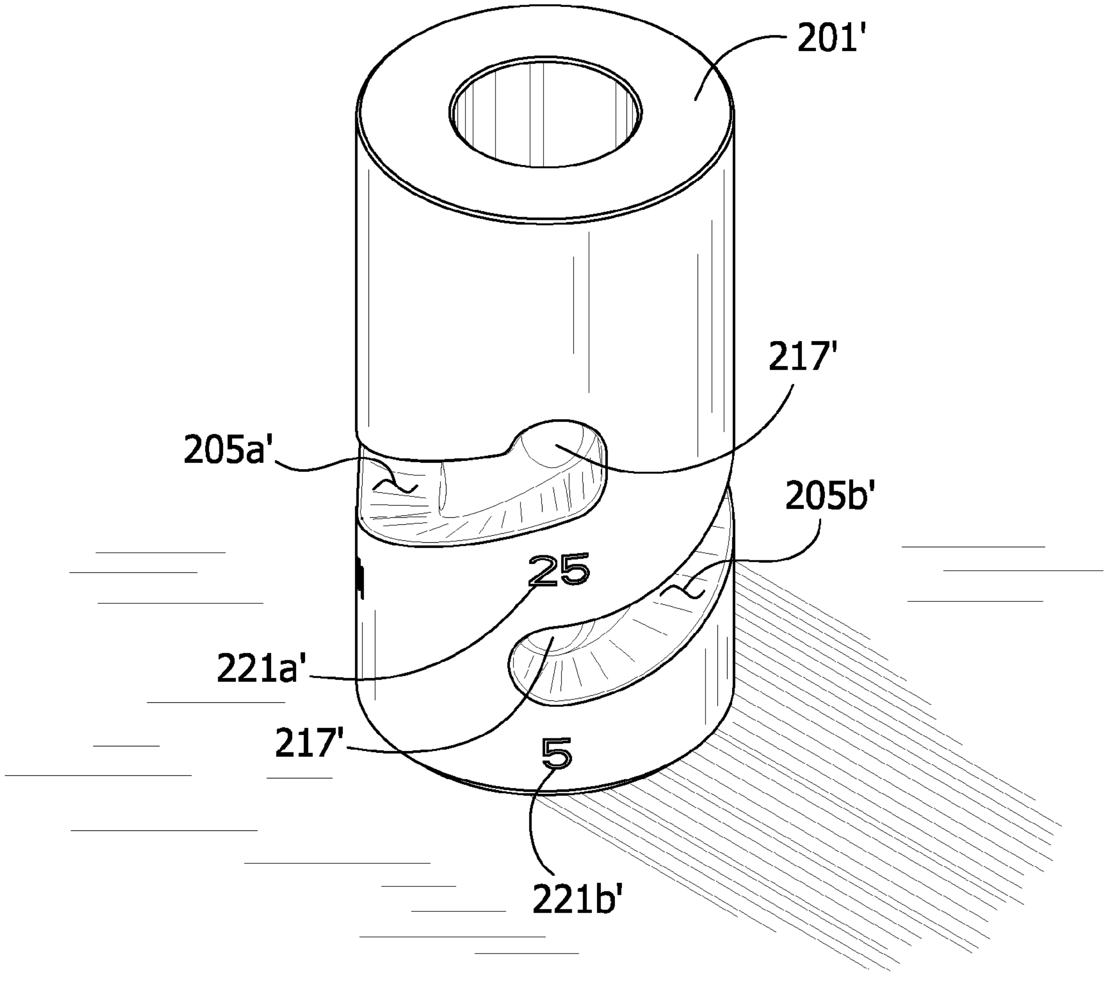
FIG. 16 is a perspective view of another spacer.

Referring to FIG. 16, a second embodiment of a spacer 201' suitable for use with the assembly 101 shown in FIGS. 1-3, may include a first helical channel 205*a*' and a second helical channel 205*b*'. The first channel 205*a*' may be calibrated for use with a first set of containers (e.g., U.S. standard containers) and the second channel 205*b*' may be calibrated for use with a second set of containers (e.g., European standard containers). Recesses 217' and markings 221' may be provided for each of the channels 205*a*', 205*b*' in the same way described for the spacer 201 describe previously. This allows the same assembly 101 to be used for indexed movement of the spacer 201' for various different sets of containers. In order to switch from one set of containers to another, the ball detent plunger 209 is removed from one of the helical channels 205*a*', 205*b*' (e.g., by partially unscrewing the threaded member 211 to back the detent out of the channel), the spacer 201 is repositioned to align the other helical channel with the detent, and the ball detent plunger is replaced so that it received in the other helical channel.

The base 109 of the assembly 101 shown in FIGS. 1-3 may be disconnected from the body 103 to load a container C (e.g., an evacuated elution vial) into the cavity. A worker may adjust the position of the spacer 201 in preparation of the assembly 101 for use with a particular container selected from a set of containers including containers having different heights. As the spacer 201 is moved into position (e.g., by grasping and turning an exposed portion of the spacer and/or base shielding element 163), the ball detent plunger 209 may engage the corresponding recess 217, producing an audible click and/or tactile sensation indicating to the worker that the spacer is in position. The position of the spacer 201 may be confirmed by looking through the window 223 in the base extension element 161 to see which of the markings 221 is visible therein.

The container C may be loaded into the cavity 117 through the second opening 123 in the body 103. The collar 107 engages the top of the container C and guides it to the predetermined position in the cavity 117 (e.g., so that the septum at the top of the container is centered under the first opening 121). Then the base 109 may be reconnected to the body 103 to enclose the container C in the cavity 117. The spacer 201, having been adjusted for the height of the container C, holds the container so that its top is adjacent the first opening 121. Those skilled in the art will recognize that it is possible in some embodiments of the invention to adjust the position of the spacer 201 in the cavity 117 after the base 109 is connected to the assembly 101 without departing from the scope of the invention.

The cap 105 may be removed for an elution process. For example, after the cap 205 is removed (FIG. 5), the container C may be connected to a radioisotope generator by piercing the septum of the container C with a needle in fluid communication with the generator using the first opening 121 for access to the container. Then the eluate may flow into the container C through the needle (e.g., using a vacuum pressure in the container to draw the eluate out of the generator). The needle may be removed from the container C when the container has received a desired volume of eluate. The cap 105 may be releasably attached to the body 103 to limit escape of radiation emitted by the eluate from the assembly 101 through the first opening 121. Because the cap 105 is held onto the body 103 (e.g., by magnetic attraction between the cap and body) the cap is less likely to be accidentally knocked off the body. The container C may be carried to another location, such as a calibration station, while in the assembly with the cap releasably attached to the body 103 in the first orientation.

When the eluate is ready to be dispensed into other containers (e.g., syringes or other types of containers used for subsequent processing of the eluate), the cap 105 may be removed from the body 103 and placed bottom side down on a work surface. The then body 103 and base 109 of the assembly 101 may be inverted and placed on the cap 105 as shown in FIG. 6, for example. The cap 105 engages the body 103 and limits escape of radiation emitted by the eluate. When a worker is ready to transfer some of the eluate from the container C in the assembly to a different container, he or she may simply lift the body 103 and base 109 off the cap 105 to access the container through the first opening 121. For example, the body 103 and base 109 may be lifted off the cap 105 with a single hand (as shown in FIG. 7) and held with that hand while the eluate is transferred to the other container (e.g., by piercing the septum of the container C with the tip of a needle attached to a syringe and drawing the eluate into the syringe). After a desired amount of eluate has been withdrawn from the container C in the assembly 101, the body 103 and base 109 can be replaced on the cap 105 until more eluate is needed from the container.

When the container C is empty or when the eluate in the container is no longer needed, the base 109 may be rotated relative to the body 103 to open the assembly 101. A worker may manually rotate the base 109 relative to the body 103. Because of the quick turn connection 191, the worker is able to release the base 109 from the body 103 by turning the base no more than about 180 degrees, which may be accomplished without requiring the worker to release his or her grip on the body or base to rotate the base farther. In one embodiment, the base 109 may be released from the body 103 by turning the base no more than about 90 degrees. In another embodiment, the base may be released from the body by turning the base no more than about 45 degrees. Moreover, when the base 109 has been rotated a sufficient amount to release the base from the body 103, the worker receives a positive indication (e.g., a tactile sensation such as an inability to rotate the base farther) that no additional turning of the base is required to separate the base from the body. This alerts the worker to the need to keep a firm grip on the base 109 and the body 103, thereby reducing the risk that the base will accidentally separate from the body and possibly let the container C fall out of the assembly 101.

When the base 109 is separated from the body 103, the container C can be removed from the cavity 117. Then another evacuated container C may be selected and the process repeated. If the new container has a different height than the previous container, the spacer 201 may be adjusted accordingly.

Figure 19:
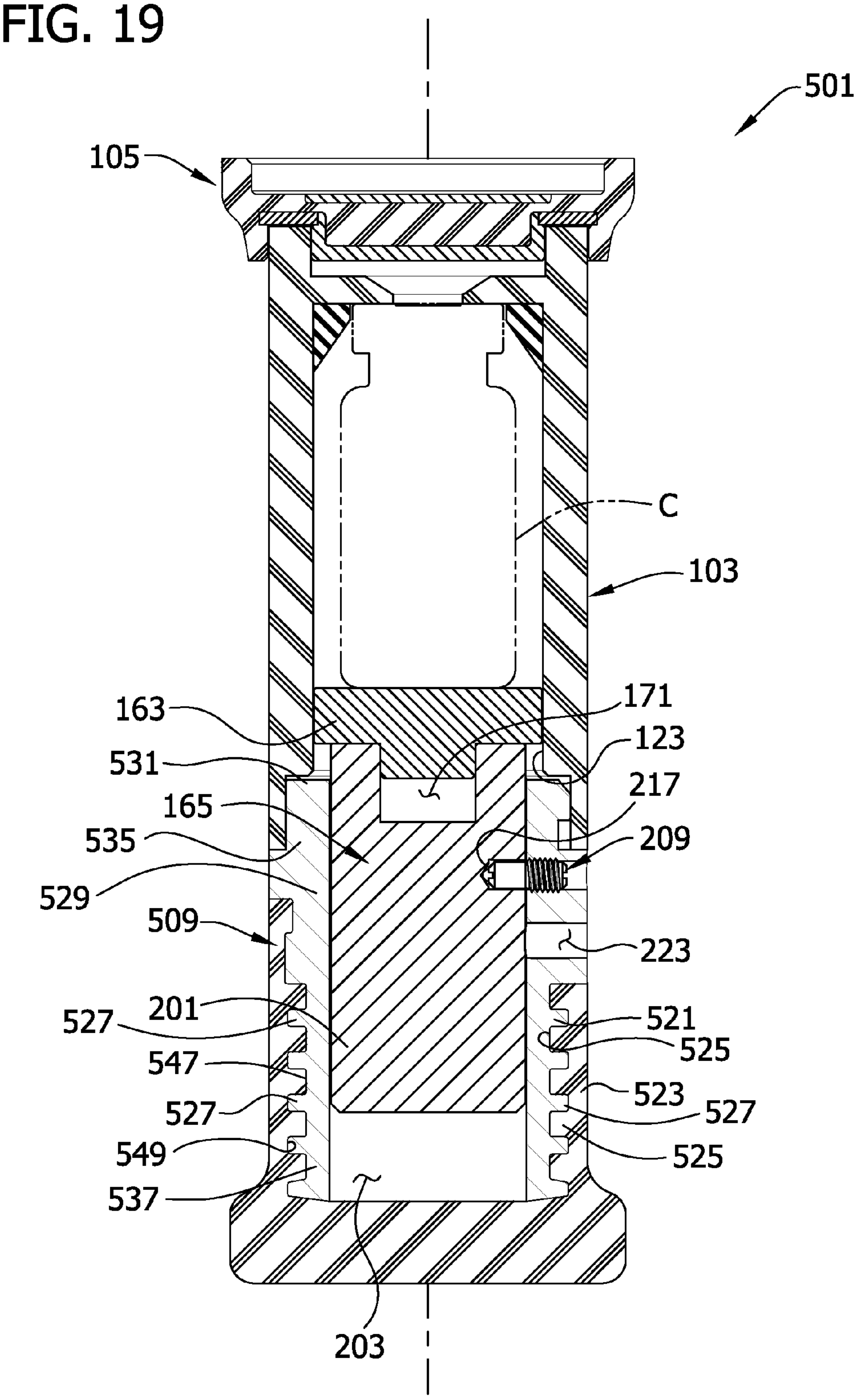
FIG. 19 is a vertical section of another radiation shielding assembly.
Figure 20:
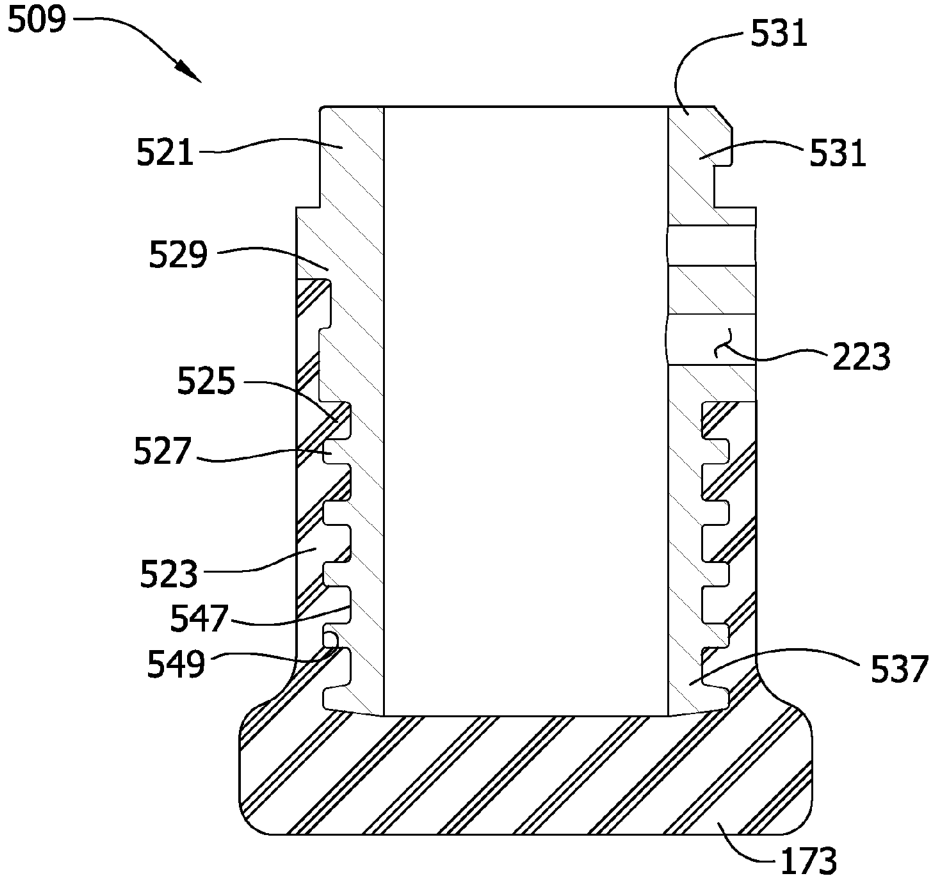
FIG. 20 is a vertical section of a base of the radiation shielding assembly of FIG. 19.
Figure 21:
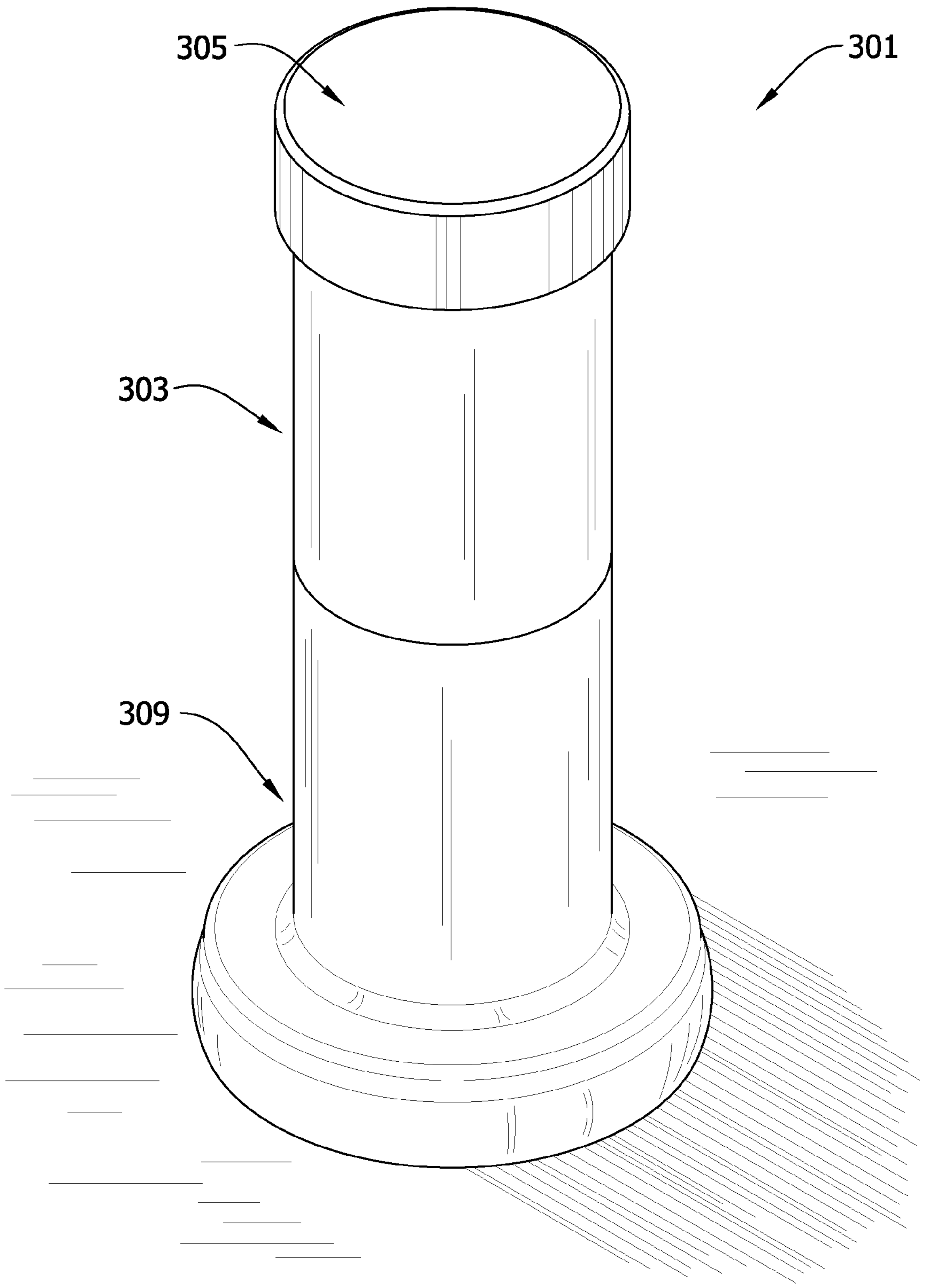
FIG. 21 is a perspective view of still another radiation-shielding assembly.

FIGS. 19 and 20 illustrate another embodiment of a radiation shielding assembly, generally designated 501, of the present invention. Except as noted, the illustrated assembly 501 is constructed and operates the same as the assembly 101 described above. Both assemblies 501, 101 include the same body 103, cap 105, base shielding element 163, and spacer system 165. The base 509 of the assembly 501 is similar in overall shape and function to the base 109 described above. One difference is that the base 509 comprises a radiation shielding element 521 and a non-shielding element 523. The shielding element 521 may be constructed of a relatively dense radiation shielding material (e.g., a moldable tungsten impregnated plastic material) while the non-shielding element 523 may be constructed of one or more relatively inexpensive, lightweight, durable materials, such as high impact polycarbonate materials (e.g., Lexan®), nylon, and the like. The non-shielding element 523 may surround at least a portion of the shielding element 521.

For example, the shielding element 521 shown in the figures has a generally tubular portion 529. A moldable plastic material may be molded over the shielding element 521 to form the non-shielding element. One end 531 of the shielding element 521 may extend from the non-shielding element and be adapted to releasably secure the base 509 to the body 103 in substantially the same manner as the base 109 of the assembly 101 described above. As shown in FIGS. 19 and 20, the tubular portion 529 of the shielding element may transition from a relatively thicker portion 535 at the end that is closer to the body 103 when the base is releasably secured to the body to a relatively thinner portion 537 at the opposite end. Moreover, the non-shielding element 523 may extend farther away from the body 103 than the shielding element 521 when the base 509 is releasably secured to the body. Consequently, the radiation shielding provided by the base 509 may concentrated in the part of the base that is adjacent the radioactive material in the container C. Further, the center of gravity of the assembly 501 is shifted toward the end of the assembly opposite the base (compared to where it would be if the entire base were made of radiation shielding material), thereby increasing stability of the assembly when it is placed on a support surface (e.g., in a manner analogous to the way the assembly 101 described above is oriented in FIGS. 6 and 6A).

The non-shielding element 523 may have an internal surface defining a plurality of inwardly extending ridges 525. The shielding element 521 may have an external surface defining a plurality of outwardly extending ridges 527 such that the inwardly extending ridges 525 of the non-shielding element engage grooves 547 defined by the outwardly extending ridges and the outwardly extending ridges 527 engage grooves 545 defined by the inwardly extending ridges. The non-shielding element may be fixed to the shielding element by engagement of the grooves and ridges. One advantage of forming the non-shielding element 523 in an overmolding process is that the inwardly extending ridges 525 thereof may be formed in situ relative to the grooves defined by the outwardly extending ridges of the shielding element. It is understood that the base 509 shown in FIGS. 19 and 20 may be used with radiation shielding assemblies having configurations other than shown herein without departing from the scope of the present invention.

Figure 22:
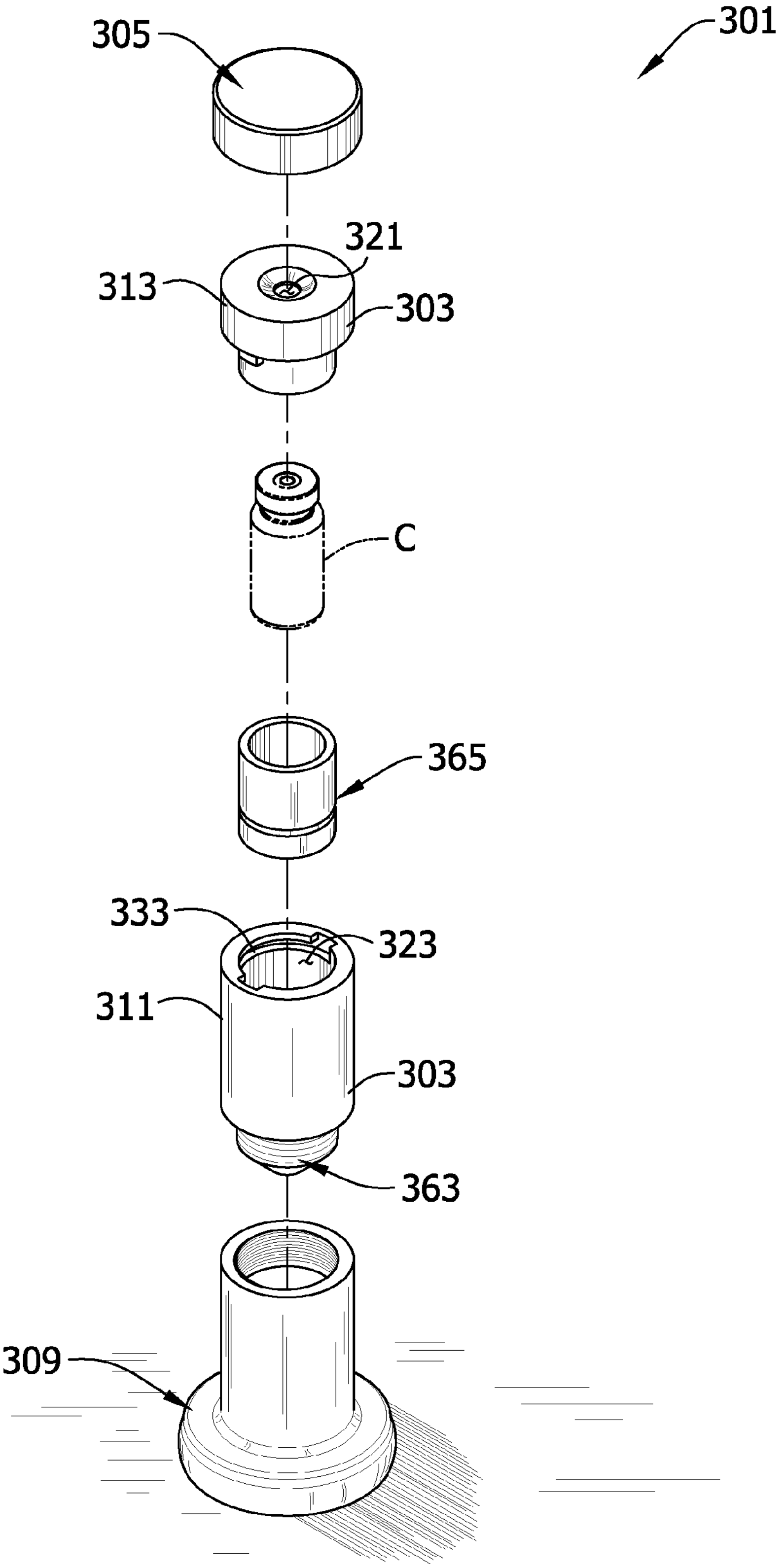
FIG. 22 is an exploded perspective view of the assembly of FIG. 21.

Another embodiment of the invention is depicted in FIGS. 21-23C as a dual-purpose front loaded radiation shielding assembly, generally designated 301, which is suitable for use as elution and/or dispensing shield. As best seen in FIG. 22, the assembly includes a cap 305, a body 303 at least partially defining a cavity 317, a spacer 365, and a base 309. The assembly 301 is generally similar in construction and operation to the assembly 101 described above.

The body 303 may be a two-part body including a main body 311 and a lid 313. The main body 311 may be a generally tubular structure having an open top end 333 defining an opening 323 (FIG. 22) sized to permit a container C to pass therethrough for loading and unloading of containers to and from the cavity 317 and a closed bottom end 363 adapted to limit escape of radiation emitted in the cavity 317 from the assembly 301 through the bottom of the body 303. The lid 313 is adapted to be received in the opening 323 of the main body 311. Moreover, the lid 313 defines an opening 321 that may be similar to the first opening 121 of the assembly 101 described above. The cap 305 may be similar in construction and operation to the cap 105 of the assembly 101 discussed above.

Figure 23A:
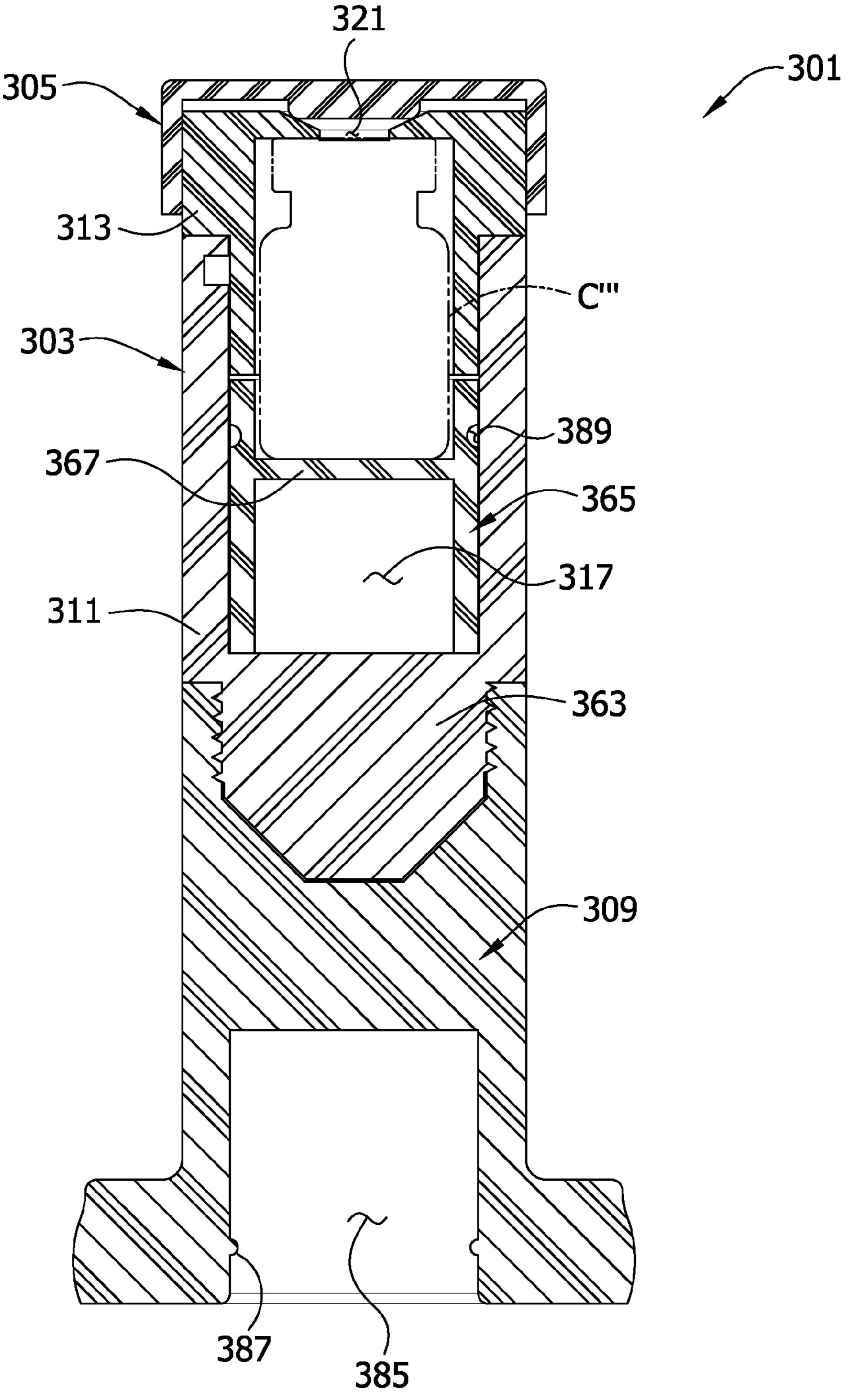
FIGS. 23A-23C are vertical sections of the assembly of FIG. 21 showing a sequence in which the assembly is adapted to hold three progressively taller containers (shown in phantom)
Figure 23B:
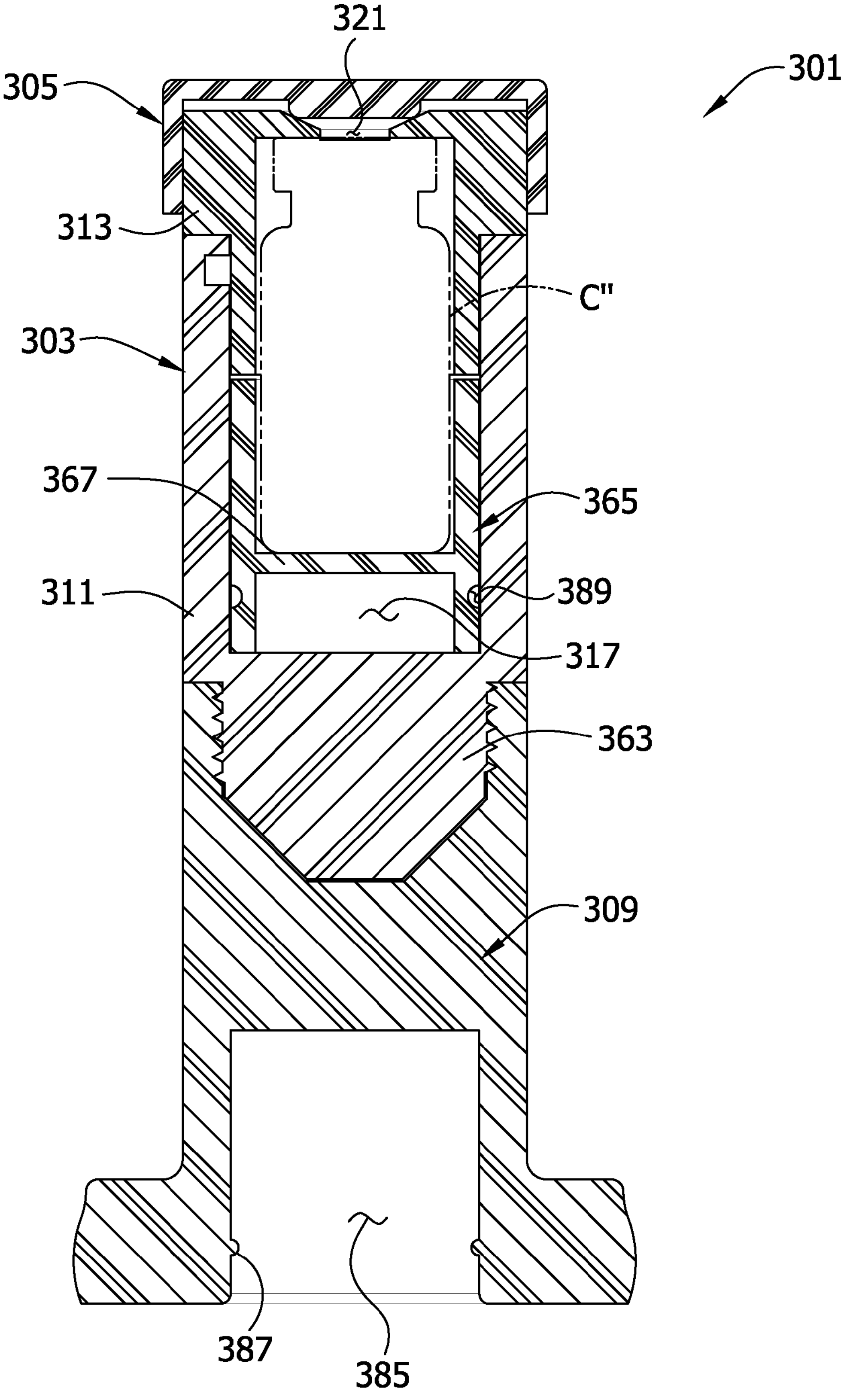
Figure 23C:
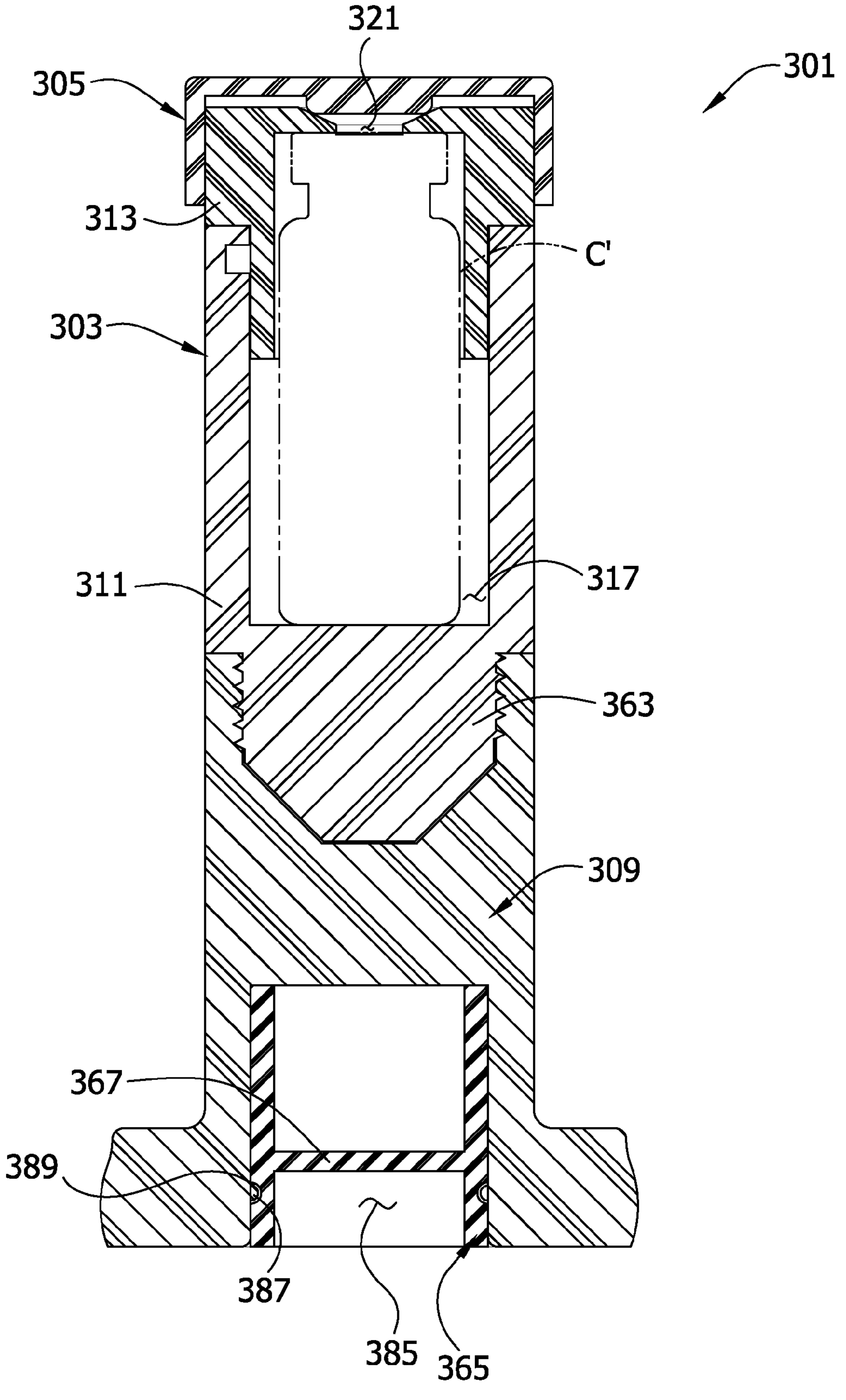
Figure 24:
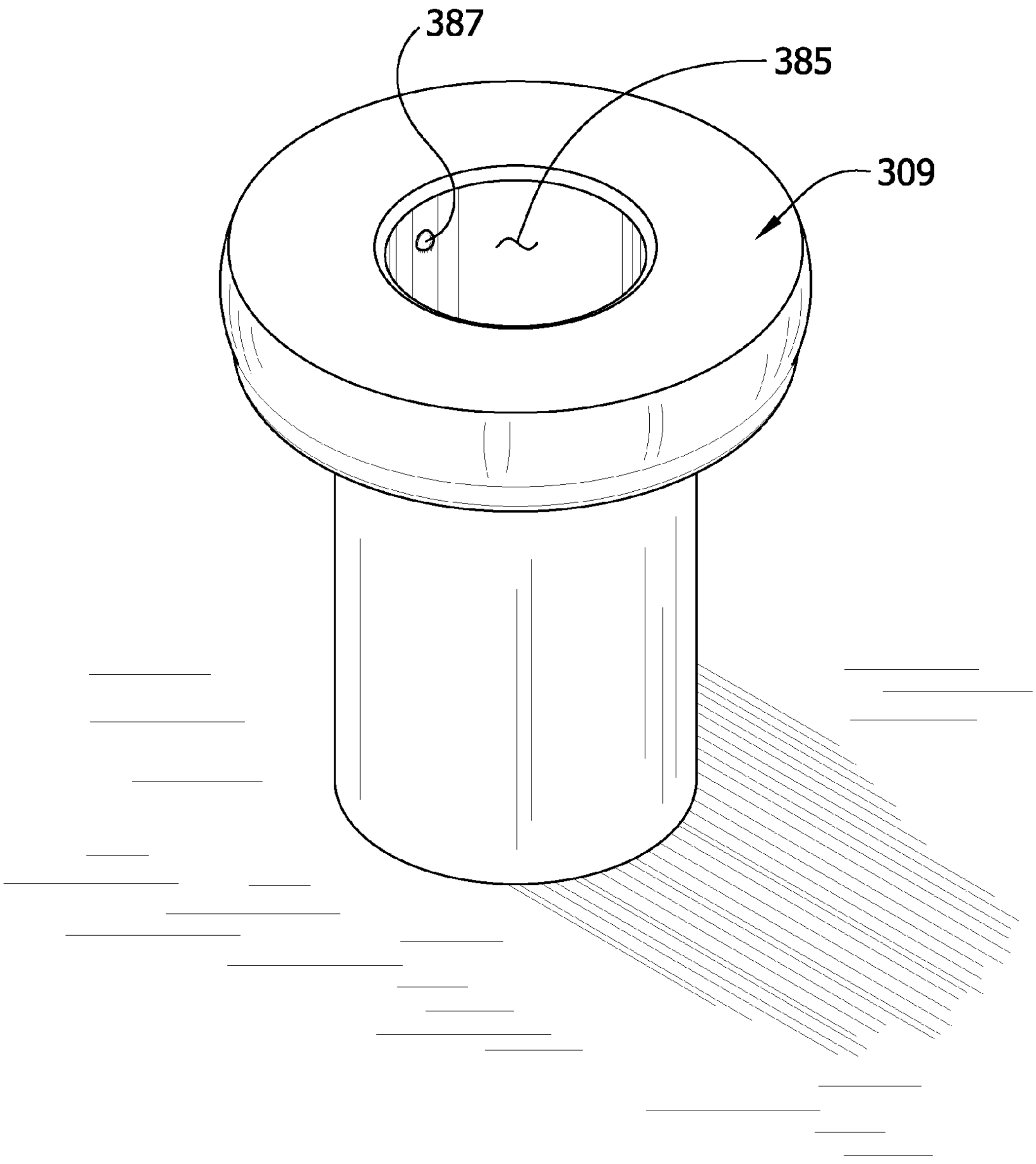
FIG. 24 is a perspective view of a base of the assembly of FIG. 21 showing a stowage compartment in the bottom of the base for storing a spacer.

The spacer 365 shown in FIGS. 22-23C may be a cylindrical sleeve having a perpendicular cross support 367 spanning the inner diameter of the spacer. The spacer 368 may be positioned as shown in 23A for use with a relatively shorter container C'''. To adapt the assembly 301 for use with a taller container C'', the spacer 365 may be inverted as shown in FIG. 23B. To adapt the assembly 301 for use with an even taller container C' the spacer 365 may be removed from the cavity.

The bottom of the main body 311 may be adapted for connection (e.g., a threaded connection) to the base 309. The base of the embodiment shown in the figures may be similar in construction to the lightweight base extension element described above. The spacer system 165 described above is not used in this embodiment and the base shielding element 163 may be omitted because it would be redundant with the closed bottom end 363 of the main body 311. The base 309 defines a stowage receptacle 385 sized and shaped for storing the spacer 365 when it is not in the cavity 317. The base 309 and/or spacer 365 may be adapted to releasably secure the spacer within the stowage receptacle 385 to prevent the spacer from falling out of the stowage receptacle. For example, the base 309 may include detents 387 (FIGS. 23A-23C and 24) adapted to engage recesses 389 in the spacer to establish a snap connection between the spacer 365 and the base 309. Other fasteners could be used instead without departing from the scope of the invention.

Figure 25:
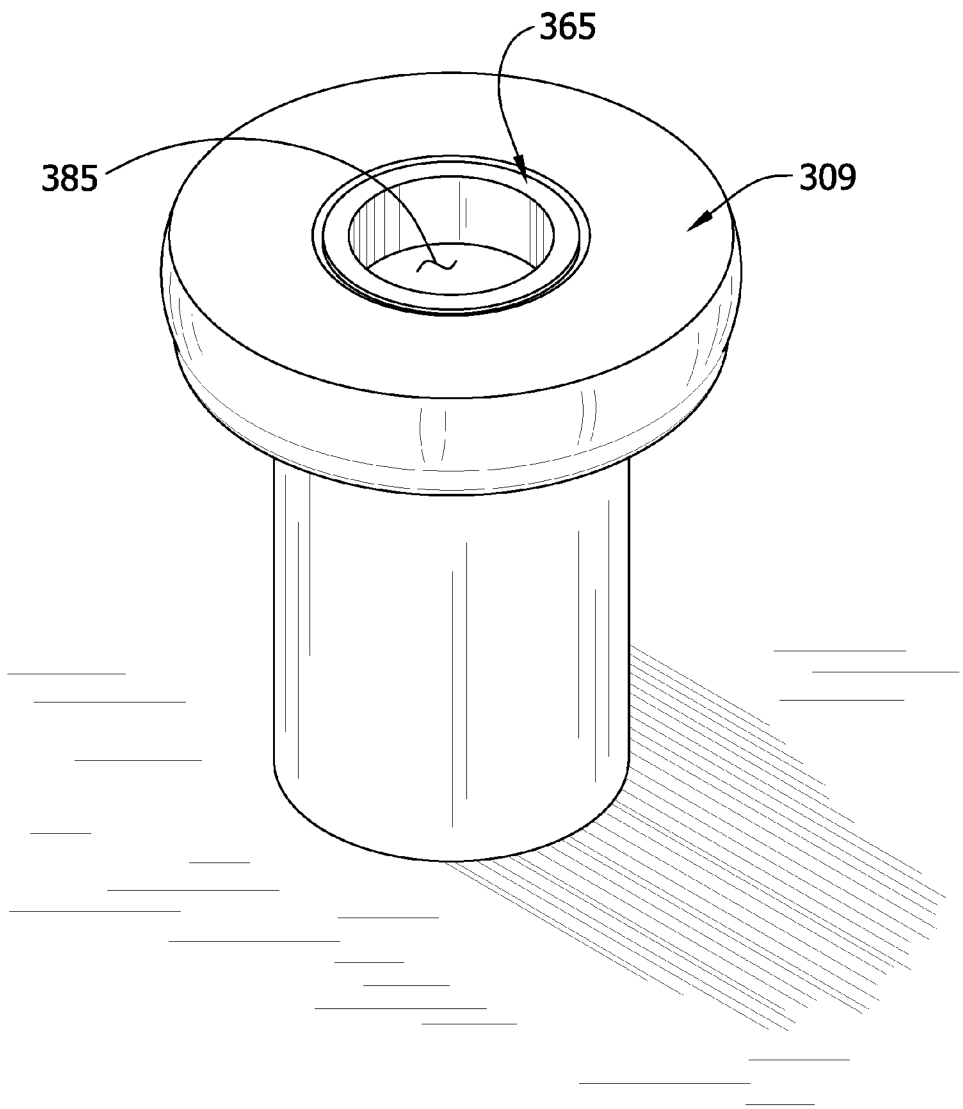
FIG. 25 is another perspective view of the base similar to FIG. 24 showing a spacer stowed in the compartment in the base.

Use of the assembly 301 is generally similar to use of the assembly 101 described above. One difference in use is the manner in which containers C are loaded into and taken out of the cavity 317. The assembly 301 can be used for elution and dispensing just like the assembly 101 described previously. The spacer 365 may be adjusted for a particular container selected from a set of containers C', C'', C''' having different heights. When the spacer 365 is not used (e.g., when the tallest container C' of the set is being held in the cavity 317) the spacer may be stowed in the stowage receptacle 385 in the bottom of the base 309, as shown in FIGS. 23C and 25. For example, the stowage receptacle 385 may be sized and shaped to permit the spacer 365 to be inserted into the stowage receptacle so that the spacer is in close fitting relationship with the sides of the receptacle. By inserting the spacer 365 into the receptacle 385, the user may engage a snap fit (as shown in the figures), a friction fit, or another suitable means of securing the spacer in the receptacle. The user may secure the spacer 365 in the receptacle 385 after it is already in the receptacle (e.g. by using a separate fastener, for example) without departing from the scope of the invention.

Those skilled in the art will recognize that the radiation-shielding assemblies 101, 301 described above can be modified in many ways without departing from the scope of the invention. For example, the cap may be a non-reversible cap releasably attached to the body by a bayonet connection, a threaded connection, a snap connection or other suitable releasable fastening system without departing from the scope of the invention. The collar may be omitted if desired. The assembly can be modified to accommodate virtually any style of container. Likewise, the assembly can be modified for use with other styles of radioisotope generators. An assembly may be used only for elution or only for dispensing without departing from the scope of the invention.

In view of the above, it will be seen that the several objects of the invention are achieved and other advantageous results attained.

When introducing elements of the present invention or the illustrated embodiments thereof, the articles "a", "an", "the", and "said" are intended to mean that there are one or more of the elements. The terms "comprising", "including", and "having" and variations of these terms are intended to be inclusive and mean that there may be additional elements other than the listed elements. Moreover, the use of "top" and "bottom" and variations of these terms is made for convenience, but does not require any particular orientation of the components.

As various changes could be made in the above assemblies and methods without departing from the scope of the invention, it is intended that all matter contained in the above description and shown in the accompanying figures shall be interpreted as illustrative and not in a limiting sense.

What is claimed is:

1. An elution shield for a container designed to have a radioactive material disposed therein, the elution shield comprising:

a body including a sidewall at least partially defining a container-receiving cavity having a diameter, the body defining an opening into the cavity at a first end of the body, the body comprising at least one radiation shielding material;

a base adapted to be releasably secured to the body at a second end thereof, the base being elongate relative to the diameter of the cavity in a direction transverse to the diameter of the cavity, the base comprising a sidewall extension portion having an open end and a closed end, the open end of the sidewall extension portion being disposed closer to the second end of the body than the closed end of the sidewall extension portion, the sidewall having a relatively heavier-weight construction and the sidewall extension portion having a relatively lighter-weight construction; and a base shielding element comprising at least one radiation shielding material, the base shielding element disposed closer to the open end of the sidewall extension portion than the closed end.

2. The elution shield of claim 1, wherein the opening defined by the body at the first end is a first opening, the first opening being of a first size, the body defining a second opening at the second end, the second opening being of a second size greater than the first size, the second end of the body being releasably securable with the base.

3. The elution shield of claim 1, wherein the body comprises a main body and a lid, the opening defined by the body is a first opening defined in the lid, the main body defining a second opening sized to permit passage of a container therethrough, the lid being adapted to at least partially cover the second opening.

4. The elution shield of claim 3 wherein the first opening is sized to prohibit passage of the container therethrough.

5. The elution shield of claim 1, wherein the base comprises a plastic material.

6. The elution shield of claim 1, wherein the base comprises a polycarbonate material.

7. A method for using the elution shield of claim 1 in eluting a radioisotope from a radioisotope generator, the method comprising:

placing a container within the body;

connecting the container to the radioisotope generator; and eluting the radioisotope from the radioisotope generator.

8. The elution shield of claim 1, wherein the sidewall extension portion further comprises a plurality of stabilizers disposed near the closed bottom, the stabilizers extending outward from the closed bottom.

9. The elution shield of claim 1, wherein the base is adapted to be releasably secured to the body by a quick turn connection.

10. An elution shield for a container designed to have a radioactive material disposed therein, the elution shield comprising:

a body including a sidewall at least partially defining a container-receiving cavity having a diameter, the body defining an opening into the cavity at a first end of the body, the body comprising at least one radiation shielding material; and a base adapted to be releasably secured to the body at a second end thereof, the base being elongate relative to the diameter of the cavity in a direction transverse to the diameter of the cavity, the base comprising:

a sidewall extension portion, a radiation shielding element, and a non-radiation shielding element surrounding at least a portion of the radiation shielding element, wherein the radiation shielding element has a generally tubular configuration, the sidewall having a relatively heavier-weight construction and the sidewall extension portion having a relatively lighter-weight construction.

11. The elution shield of claim 10, wherein the generally tubular configuration of the radiation shielding element transitions from a relatively thicker portion at one end to a relatively thinner portion at an opposite end, the relatively thicker portion being closer to the body when the base is releasably secured to the body.

12. The elution shield of claim 10, wherein the non-radiation shielding element of the base is overmolded to the radiation shielding element.

13. The elution shield of claim 12, wherein an internal surface of the non-radiation shielding element of the base defines a plurality of inwardly extending ridges and an external surface of the radiation shielding element defines a plurality of outwardly extending ridges, said inwardly extending ridges of the non-shielding element engaging grooves defined by the plurality of outwardly extending ridges of the radiation shielding element.

14. The elution shield of claim 10, wherein the radiation shielding element is constructed of a moldable tungsten impregnated plastic material.

15. The elution shield of claim 10, wherein the non-radiation shielding element and the radiation shielding element are configured so that the non-radiation shielding element extends farther from the body than the radiation shielding element when the base is releasably secured to the body.

16. A method for using the elution shield of claim 10 in eluting a radioisotope from a radioisotope generator, the method comprising:

placing a container within the body;

connecting the container to the radioisotope generator; and eluting the radioisotope from the radioisotope generator.

* * * * *